000

United States Patent
Hull et al.

(10) Patent No.: US 7,668,536 B2
(45) Date of Patent: Feb. 23, 2010

(54) RETRIEVING MEDIA ITEMS TO A MOBILE DEVICE

(75) Inventors: Richard Hull, Bristol (GB); Paul John Marsh, Bristol (GB); Josephine Reid, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1289 days.

(21) Appl. No.: 10/635,925

(22) Filed: Aug. 5, 2003

(65) Prior Publication Data
US 2004/0132467 A1 Jul. 8, 2004

(30) Foreign Application Priority Data

Aug. 6, 2002 (GB) ................................. 0218188.1
Oct. 18, 2002 (GB) ................................. 0224266.7

(51) Int. Cl.
*H04M 3/42* (2006.01)
(52) U.S. Cl. ................... 455/414.1; 455/458; 455/41.2; 455/552.1; 455/11.1
(58) Field of Classification Search ................. 455/41.2, 455/552.1, 456.1, 556.3, 11.1, 458; 705/26
See application file for complete search history.

(56) References Cited

U.S. PATENT DOCUMENTS

| 6,477,353 | B1 * | 11/2002 | Honda et al. ................ 455/11.1 |
| 6,539,393 | B1 * | 3/2003 | Kabala ......................... 707/102 |
| 6,757,518 | B2 * | 6/2004 | Spratt et al. ................. 455/11.1 |
| 6,819,908 | B2 * | 11/2004 | Spratt ......................... 455/11.1 |
| 6,847,823 | B2 * | 1/2005 | Lehikoinen et al. ....... 455/456.1 |
| 6,859,639 | B2 * | 2/2005 | Spratt et al. ................. 455/11.1 |
| 6,999,717 | B2 * | 2/2006 | Spratt et al. ................. 455/11.1 |
| 2002/0161666 | A1 * | 10/2002 | Fraki et al. ..................... 705/26 |
| 2004/0027619 | A1 * | 2/2004 | Sato et al. .................... 358/407 |

FOREIGN PATENT DOCUMENTS

| EP | 1 039 721 A2 | 9/2000 |
| GB | 2 352 588 A | 1/2001 |
| WO | 99/67904 A1 | 12/1999 |

OTHER PUBLICATIONS

"DARPA ITO Sponsored Research: Pheromone Robotics," Internet: <http://www.darpa.mil/ito/psum2001/H892-0.html> 3 pages total (Feb. 26, 2002).

(Continued)

*Primary Examiner*—Patrick N Edouard
*Assistant Examiner*—Wayne Cai

(57) ABSTRACT

A user visiting a space is equipped with a mobile device in communication with a service system. Media items held by the service system are associated with various locations around the space and a user arriving at such a location is presented with the corresponding item or items. Preferably, these media items are preemptively loaded into a cache of the user's mobile device in dependence on the user's progress around the space. Items can also be flushed from cache on this basis. In order to reduce load on the service system and the related communication infrastructure, a media item needed by a mobile device is first sought from a nearby device using a short-range communication mechanism.

28 Claims, 9 Drawing Sheets

OTHER PUBLICATIONS

"Learning's in the air: museums, microcosms, and the future of the mobile net," *Mpulse: A Cooltown Magazine*, Internet: <http://www.cooltown.com/mpulse/0901-museums.asp?print=yes> 3 pages total (Mar. 13, 2002).

Bederson, B.B., "Audio Augmented Reality: A Prototype Automated Tour Guide," *ACM Human Computer in Computing Systems conference (CHI '95)*, pp. 210-211, Internet: <http://www.cs.umd.edu/-bederson/papers/chi-95-aar/index.html> 4 pages total (Feb. 2, 2002).

Dorigo, M., et al., "Ant colonies for the traveling salesman problem," *BioSystems*, pp. 1-10 (1997).

Payton, D., et al., "Pheromone Robotics," HRL Laboratories, 32 pages total.

Payton, D., et al., "Progress in Pheromone Robotics," HRL Laboratories, 9 pages total (2001).

Russell, R.A., "Assoc. Prof. Andy Russell," Internet: <http://www.ecse.monash.edu.au/staff/rar/> 5 pages total (Aug. 5, 2002).

Spasojevic, M., et al., "A Study of an Augmented Museum Experience," 6 pages total.

* cited by examiner

RETRIEVING MEDIA ITEMS TO A MOBILE DEVICE

FIELD OF THE INVENTION

The present invention relates to a method and arrangement for retrieving a data item to a mobile device carried by a user visiting a real-world space, such as an exhibition hall, the data item being available from a service system to mobile devices of users visiting the space.

BACKGROUND OF THE INVENTION

In many uses of mobile computing devices, data (and/or services) stored on networked servers are associated with particular physical locations. The mobile devices are expected to access that data via a network connection when they are at the locations associated with the data. Once data has been loaded into the cache memory of a mobile device, it is well known to retain the data beyond its initial use in order to speed subsequent accesses to the same data, such subsequent accesses being a common occurrence. As the device memory is of finite size, it is periodically necessary to free up space in the cache memory.

Device memory is but one limited resource in such a system. The servers and/or the communications infrastructure between the servers and the mobile devices can become a bottleneck if the mobile devices are all frequently requesting data items. It is known to provide distributed or cooperative caching in which data can be stored in and retrieved from any of multiple data caches. There are many algorithms for finding data in such caches and for maintaining cache coherency. For example, see *A Survey of Cooperative Caching*, Raunak, M. at http://citeseer.nj.nec.com/432816.html.

It is object of the present invention to provide a way of reducing the loading on the infrastructure used to store data items of interest to mobile device users.

SUMMARY OF THE INVENTION

According to one aspect of the present invention, there is provided a method of retrieving a data item to a mobile device carried by a first user visiting a real-world space, the data item being available from a service system to mobile devices of users visiting the space; the method comprising the steps of:
(a) seeking to retrieve the data item to the first user's mobile device by transfer from another mobile device in said space;
(b) in the event that step (a) is unsuccessful, retrieving the data item to the first user's mobile device by transfer from the service system.

According to another aspect of the present invention, there is provided an arrangement for retrieving a data item to a mobile device carried by a first user visiting a real-world space, the data item being available from a service system to mobile devices of users visiting said space; the arrangement comprising:
  first retrieval means for seeking to retrieve the data item to the first user's mobile device by transfer from another mobile device;
  second retrieval means for retrieving the data item to the first user's mobile device by transfer from the service system; and
  control means for organising retrieval of the data item by first causing the first retrieval means to seek to retrieve the data item and then, if this is unsuccessful, causing the second retrieval means to retrieve the data item.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 1:
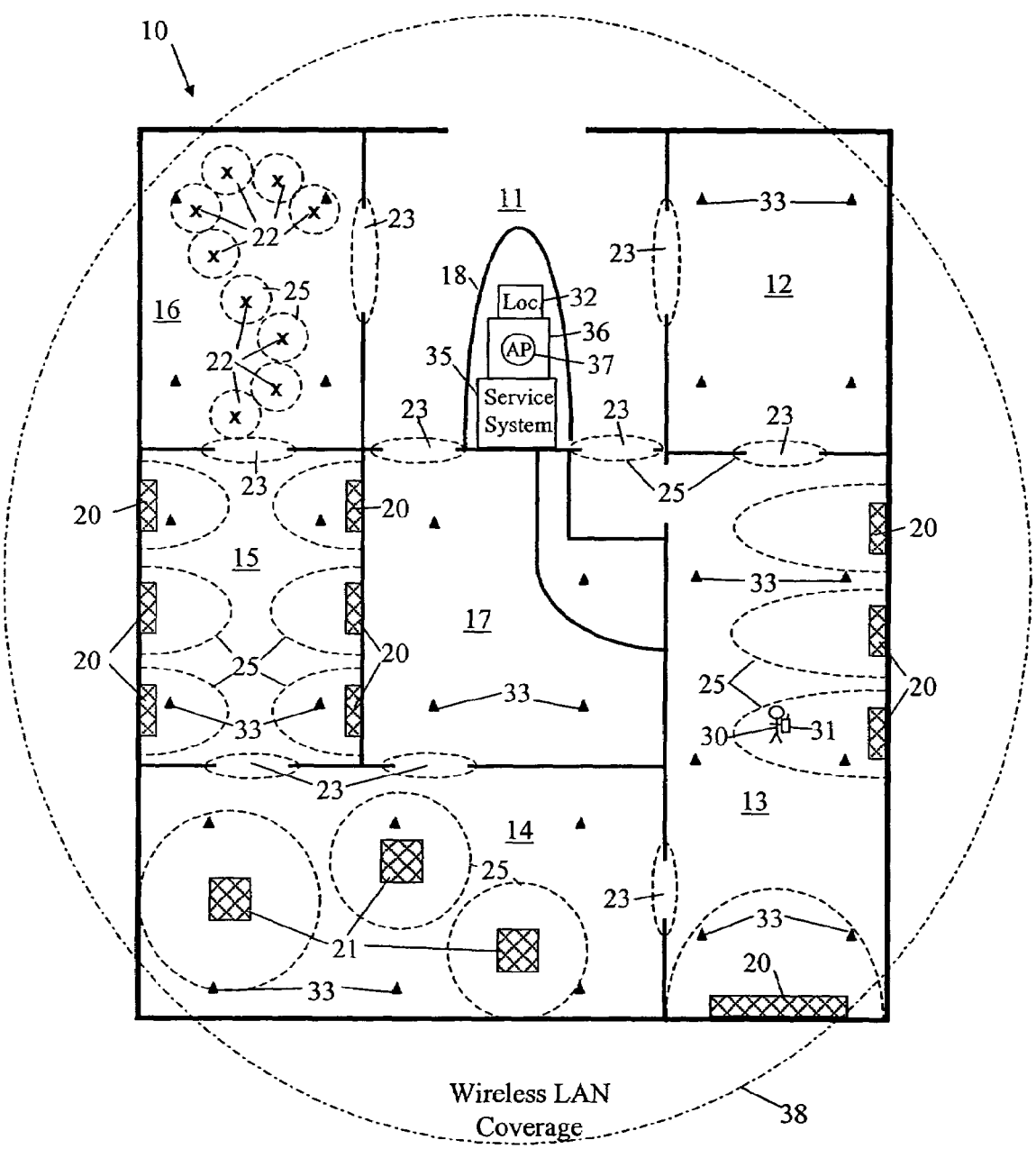
FIG. 1 is a diagram of an exhibition hall having an arrangement for delivering relevant media objects to visitors in a timely manner as the visitors encounter items of interest in the hall.

FIG. 1 depicts a real-world environment for which a number of zones have been defined in a virtual world that maps onto the environment. When a person moving in the environment (called a "user" below) is detected as moving into one of these zones, one or more media objects are delivered to the user via a communications infrastructure and a mobile device carried by the user. A zone may correspond to an area around a real-world object of interest with the media object(s) delivered to a user in this area relating to that real-world object. Alternatively, a zone may not correspond to any real-world object.

In considering such an arrangement, it is convenient, though not essential, to introduce the abstraction of a virtual feature which is the subject of each zone. Each such virtual feature is given a number of properties such as a unique identifier, a location in the real-world environment, the real-world extent of the zone associated with the feature, a subject description indicating what the feature concerns, and a set of one or more media-object identifiers identifying the media objects (or "feature items") associated with the feature. The zone associated with a virtual feature is referred to hereinafter as the 'active zone' of the feature.

For a feature that is intended to correspond to a particular real-world item (and typically having an active zone that maps to an area about a real-world object), this can be indicated in the subject description of the feature. Using the feature abstraction makes it easier to associate feature items that all relate to the same zone and also facilitates adding/ removing these features items since data about the real-world extent of the related zone is kept with the feature and not each feature item.

Each feature is represented by a feature record held in a data-handling system, the feature records together defining the aforesaid virtual world that maps to the real-world environment. Each feature can be thought of as existing in this virtual world with some of these virtual features mapping to real-world objects.

As already noted, when a user is detected as within an active zone of a feature, one or more feature items are delivered to the mobile device of the user for presentation to the user. A feature item can be presented automatically to the user upon delivery or the item can be cached and only presented upon the user having expressed an interest in the feature in some way such as by dwelling in the active zone of the feature more than a minimum time or by explicitly requesting presentation of the feature item. Indeed, the delivery of the feature item to the mobile device can also be deferred until the user is detected as having expressed an interest in the feature; however, since this approach can introduce a delay before the item is available for presentation, the embodiments described below deliver feature items to the mobile device of the user without awaiting a specific expression of interest in each feature (though, of course, a general filtering may be applied as to what items are delivered according what types of features are of interest to the user). Preferably, each feature or feature item is given a property indicating whether feature item delivery is to be effected automatically upon delivery or only after a user has expressed an interest in the feature; this enables important items (such as warning messages concerning features associated with potentially hazardous real-world items) to be pushed to the user whilst other items are subject to an expression of interest by the user. Advantageously, a user may elect to have feature items automatically presented even when the corresponding feature/item property does not require this. Furthermore, since as will be described hereinafter, pre-emptive caching of feature items in the user's mobile device may be implemented, automatic presentation is qualified so as only to apply where the user is in the active zone of the feature with which the feature item is associated.

Considering the FIG. 1 example in more detail, the environment depicted is an exhibition hall 10 having rooms 11 to 17 where:

room 11 is an entrance foyer with reception desk 18 but no associated virtual features;
  room 12 is a reference library with no associated virtual features;
  rooms 13, 14 and 15 are used for displaying real-world objects, namely paintings 20 and sculptures 21, for each of which there is a corresponding virtual feature centred on the object concerned and with an associated active zone 25 (indicated by a dashed line);
  room 16 is used for experiencing virtual features for which there are no corresponding real-world objects, the location associated with each feature being indicated by a cross 22 and the corresponding active zone 25 by a dashed line; and
  room 17 is a cafeteria with no associated virtual features.

Virtual features are also defined in correspondence to the majority of openings 23 between rooms, the active zones 25 associated with the features again been indicated by dashed lines. Typically, the feature items associated with these features are incidental information concerning the room about to be entered and are automatically presented. It will be seen from FIG. 1 that only a single feature is applied to an opening 23 so that it is not possible to tell simply from the fact that a user is detected in the active zone of the feature which room the user is about to enter; however, as will be later described, it is possible to determine from the user's past activity (either location based or feature based) the general direction of progression of the user and therefore which room is about to be entered. This enables the appropriate feature item to be selected for delivery to the user from amongst the items associated with the feature.

On entering the exhibition hall 10, a user 30 collects a mobile device 31 from the reception desk 18 (or the user may have their own device). This device 31 cooperates with location-related infrastructure to permit the location of the user in the hall 10 to be determined. A number of techniques exist for enabling the location of the user to be determined with reasonable accuracy and any such technique can be used; in the present example, the technique used is based on an array of ultrasonic emitters 33 (represented in FIG. 1 by black triangles) positioned at known locations in each room (typically suspended above human level). The emitters 33 are controlled by controller 32 to send out emitter-specific emissions at timing reference points that are indicated to the mobile device 31 by a corresponding radio signal sent by the controller 32. The device 31 is capable of receiving both the timing reference signals and the emissions from the ultrasonic transmitters 33. The device 31 is also pre-programmed with the locations of these emitters and is therefore able to calculate its current location on the basis of the time of receipt of the emissions from the different emitters relative to the timing reference points.

The exhibition hall is equipped with a wireless LAN infrastructure 36 comprising a distribution system and access points 37. The wireless LAN has a coverage encompassing substantially all of the hall 10, the boundary of the coverage being indicated by chain-dashed line 38 in FIG. 1. The wireless LAN enables the mobile device to communicate with a service system 35 to download feature items appropriate to the feature (if any) corresponding to the current location of the user. In the present example, the determination of when the location of the user (as determined by the device in the manner already described) places the user within the active zone of a virtual feature, is effected by the service system; however, it is also possible to have the device 31 carry out this determination provided it is supplied with the appropriate information about the feature zones.

It will be appreciated that communication between the device 31 and service system 35 can be effected by any suitable means and is not limited to being a wireless LAN.

Figure 2:
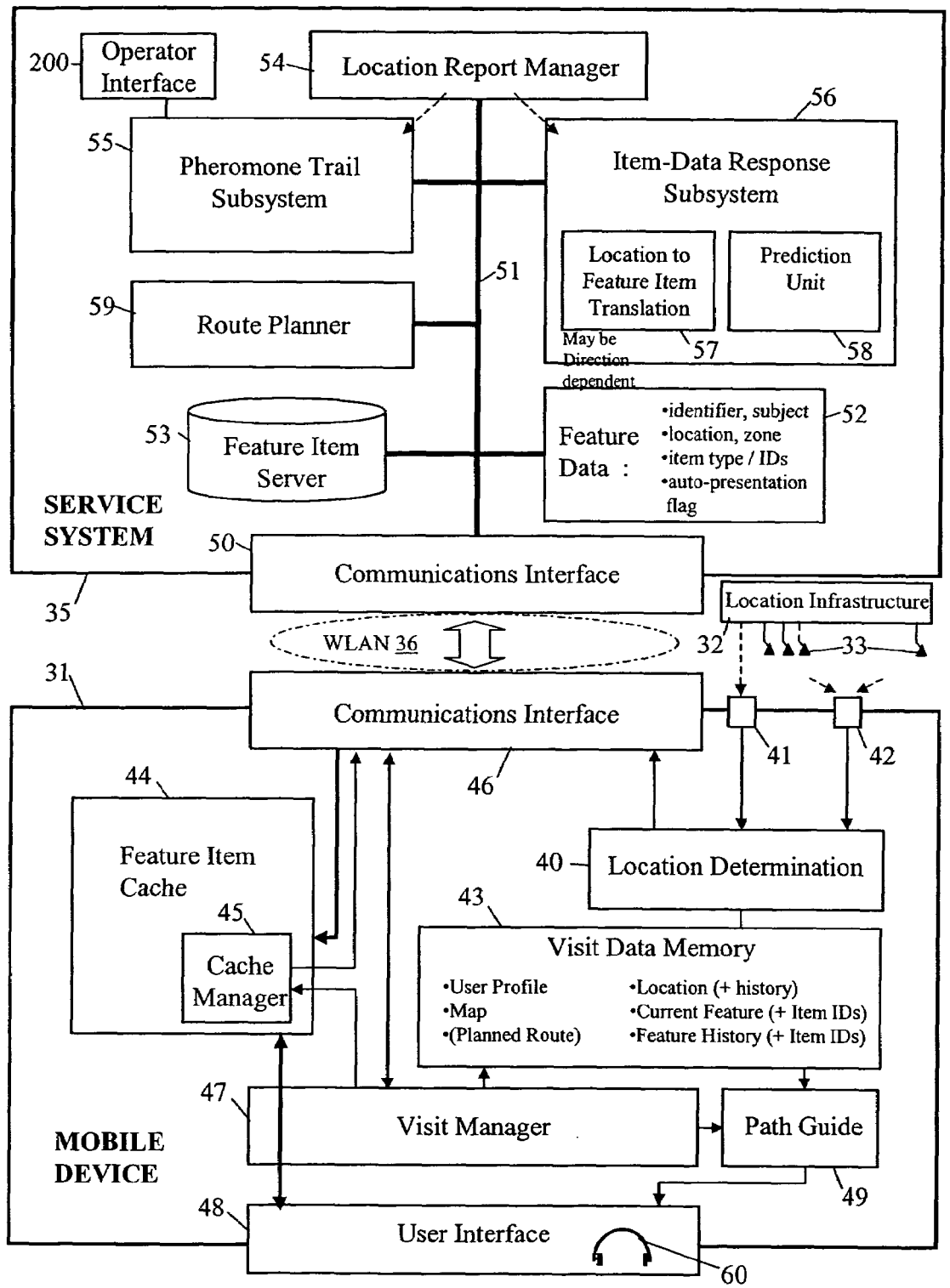
FIG. 2 is a diagram of a mobile device and service system used in the FIG. 1 arrangement.

FIG. 2 shows the mobile device 31 and service system 35 in more detail. More particularly, the mobile device 31 comprises the following functional blocks:

A location determination subsystem 40 with an associated timing reference receiver 41 and ultrasonic receiver 42 for receiving the timing reference signals from the location infrastructure 32 and the emissions from the ultrasonic emitters 33 respectively; the location determination subsystem 40 is operative to use the outputs of the receivers 41 and 42 to determine the location of the mobile device (as already described above) and to send location reports to the service system 35.

A visit data memory 43 for holding data about the current "visit"—that is, the current tour of the hall 10 being undertaken by the user of the mobile device 31.

A feature-item cache 44 for caching feature items delivered to the mobile device 31 from the service system 35. The cache 44 has an associated cache manager 45.

A communications interface 46 for enabling communication between the mobile device 31 and the service system 35 via the wireless LAN infrastructure 36.

A user interface 48 which may be visual and/or sound based; in one preferred embodiment the output to the user is via stereo headphones 60.

A visit manager 47 typically in the form of a software application for providing control and coordination of the other functions of the mobile device 31 in accordance with input from the user and the service system 35.

A visit path guide 49 for giving the user instructions/indicators for following a planned route around the hall 10.

Much of the foregoing functionality will typically be provided by a program-controlled general purpose processor though other implementations are, of course, possible.

The visit data held by memory 44 will typically include a user/device profile data (for example, indicating the subjects of interest to the user, the intended visit duration, and the media types that can be handled by the device), an electronic map of the hall 10, the user's current location as determined by the subsystem 40, and the identity of the feature (if any) currently being visited together with the IDs of its related feature items. The visit data also includes a feature history for the visit, which is either:

the history of visited features and their related feature item IDs in the order the features were visited (thus, a feature is added to the top of the visited-feature history list when the feature is encountered), or the history of accessed features and their related feature item IDs in the order the features were visited (thus, a feature is added to the top of the accessed-feature history list when one of its feature items is accessed by—that is, presented to—the user whilst the feature is the currently visited feature).

If a visited-feature history list is kept, a history of accessed features can be embedded in it by providing each feature in the history with an associated flag to indicate whether or not the feature was accessed whilst current. Although keeping a visited-feature history provides more information about the visit, it will inevitably use more memory resources than an accessed-feature history and in many cases it will only be desired to track features which the user has found sufficiently of interest to access an associated feature item. Where the purpose of the feature history is simply to keep a list of features (and related feature items) that were of interest to the user, it may be desirable to exclude from the list features for which items were automatically presented but are not associated with exhibits (real or virtual)—that is, exclude features concerned with incidental information about the hall.

The feature history preferably covers the whole of the visit though it may alternatively only cover the most recently visited/accessed features. In either case, the most recent several entries in the history list form what is hereinafter referred to as the "feature tail" of the user and provides useful information about the path being taken by the user.

The visit data held in memory 43 may further include details of a planned route being followed by the user, and a history of the locations visited by the user (this may be a full history or just the locations most recently visited—hereinafter termed the "location tail" of the user).

The service system 35 comprises the following main functional elements:

A communications interface 50 for communicating with the mobile device 50 via the wireless LAN infrastructure 36.

An internal LAN 51 (or other interconnect arrangement) for interconnecting the functional elements of the service system.

A data store 52 for storing feature data and, in particular, a feature record for each feature with each record comprising the feature identifier, the subject of the feature, the corresponding real-world location and extent of the feature's active zone, the IDs and media type of the or each associated feature item, and a flag which when set indicates that feature item presentation of an associated feature item is to be effected automatically upon delivery when the feature is being visited.

A feature-item server 53 for serving an identified feature item to the mobile device 31 in response to a request from the latter.

A location report manager 54 for receiving location reports from the location determination subsystem 40 of the mobile device and for passing on data from the reports to functional elements 55 and 56 (see below).

A pheromone trial subsystem 55 for receiving location data, via manager 54, from all user mobile devices to build up trail data in a manner akin to the use of pheromones by ants.

An item-data response subsystem 56 for receiving location and other data from the manager 54 in order to prepare and send a response back to the mobile device 31 that provided the location data, about what feature items it needs, or is likely to need, both now, in view of a feature currently being visited, and (where, as in the present embodiment, pre-emptive caching is implemented) in the near future. Subsystem 56 comprises a location-to-feature item translation unit 57 which can either be implemented independently of the data held in store 52 or, preferably, be arranged to operate by querying the store 52, the latter having associated functionality for responding to such queries. Subsystem 56 further comprises a prediction unit 58 for predicting, in any of a variety of ways to be described hereinafter, what feature items are most likely to be needed in the near future.

A route planner 59 for responding to requests from the mobile device 31 for a route to follow to meet certain constraints supplied by the user (such as topics of interest, time available, person or tour to follow, an exhibit or facility to be visited, etc). In providing a planned route, the route planner will typically access data from one or both of the feature data store 52 and the pheromone trail subsystem 55. The route planner 59 can conveniently hold a master map of the hall 10 for use by itself and the other elements of the service system 35, and for download to each mobile device 31 at the start of each new visit and/or whenever the master map is changed.

The functional elements of the service system 35 can be configured as a set of servers all connected to the LAN 51 or be arranged in any other suitable manner as will be apparent to persons skilled.

The mobile device 31 and service system 35 provide a number of useful capabilities that will each be described in detail below after an overview of the general operation of the mobile device and service system during a visit. It is to be understood that the split of functionality between the mobile device 31 and service subsystem 35 can be varied substantially form that indicated for the FIG. 2 embodiment; indeed all functionality can be provided either entirely by the mobile device 31 (with all feature items being stored in the device) or by the service system 35 (with the presentation of feature items to a user being by means of fixed input/output devices located around the hall near the locations associated with the virtual features).

In general terms, a user starting a visit can request a route to follow using the user interface 48 of the mobile device 31 to indicate parameters to be satisfied by the route. This route request is sent by the visit manager to route planner 50 and results in the download to the mobile device 31 of a planned route. The path guide 49 then provides the user (typically, though not necessarily, only when asked) with guide indications to assist the user in following the planned route. Where the interface 48 includes a visual display, this can conveniently be done by displaying a map showing the user's current location and the planned route; in contrast, where only an audio interface is available, this can be done by audio cues to indicate the direction to follow. A user need not request a planned route and in this case will receive no guide indications. A user may request a route plan at any stage of a visit (for example a route to an exhibit of interest).

Figures 3, 4:
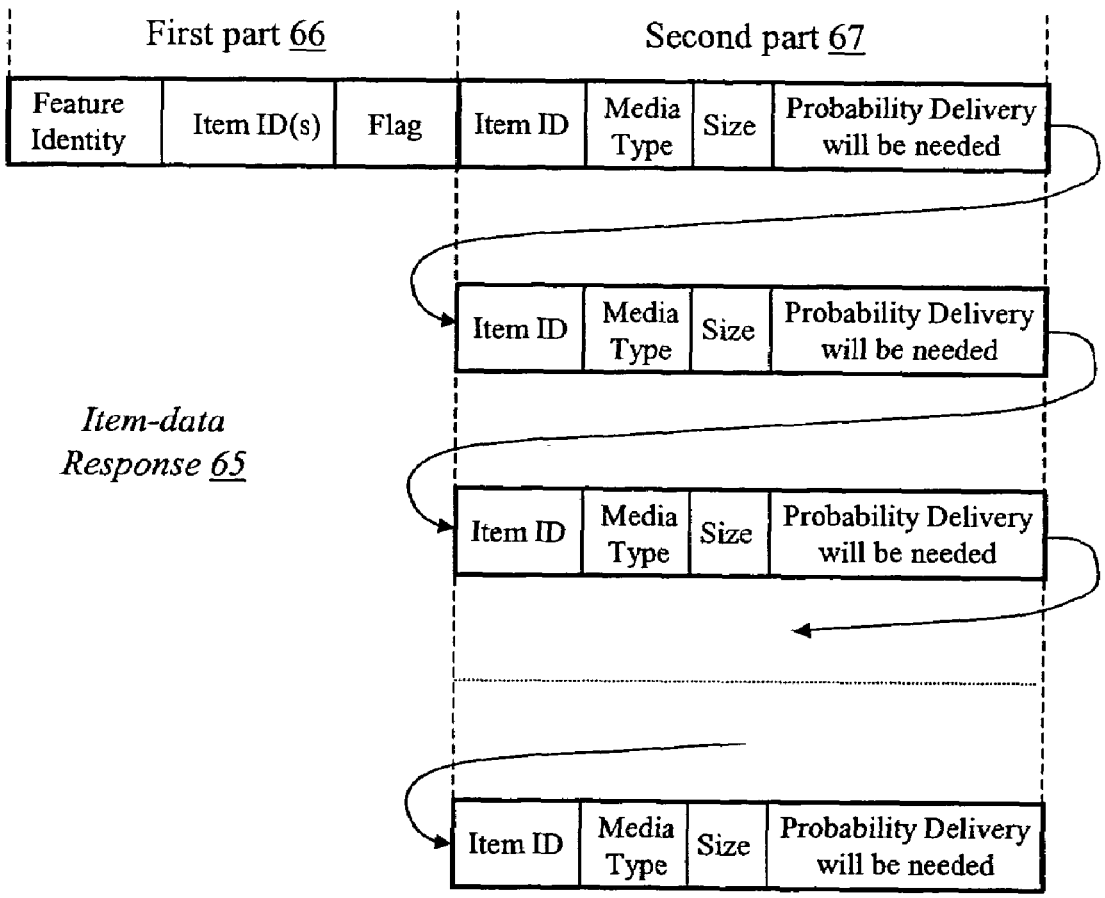
FIG. 3 is a diagram of a location report sent from the mobile device to the service system of FIG. 2.
FIG. 4 is a diagram of a response message sent by the service system to the mobile device of FIG. 2.

As the user moves through the hall, the location determination subsystem 40 sends periodic location reports 62 (see FIG. 3) to the location report manager 54 of the service system 35 via the wireless LAN 36. In addition to the user's current location, these reports typically include a user identifier (and possibly, additionally or alternatively, a type identifier indicative of any variable of interest such as, for example, the group of users to which the device user belongs or an activity being undertaken by the user), user/device profile data, and prediction-assist data for use by the prediction unit 58 in predicting what feature items are likely to be needed shortly. This prediction-assist data can comprise one or more of the following: route data concerning any planned route being followed; the user's "location tail"; and the most recent feature (either the "most-recently visited" or "most-recently accessed") associated with the user, either provided alone or as part of the user's "feature tail".

When a location report 62 is received by the manager 54, it passes on the user's current location in the report to the pheromone trail subsystem 55 to enable the latter to build up trail data from all devices; additionally, the user and/or type identifier may be passed on to subsystem 55 if provided in the location report. The user's current location is also passed to the item-data response subsystem 56 together with any profile data and prediction-assist data in the location report 62. The item-data response subsystem 56 then constructs and sends a response 65 (see FIG. 4) to the mobile device 31 that originated the location report.

More particularly, the location-item to feature translation unit 57 of subsystem 56 uses the data passed to subsystem to determine the feature, if any, currently being visited by the user and thus what feature items are relevant to the user in their current location. In doing this, the unit 57 may also use the supplied profile data to disregard both features that do not relate to a subject of interest to the user and feature items of a media type that cannot be handled by the mobile device 31. The unit 57 may also use elements of the prediction-assist data (for example, the location or feature last encountered before the current one) to enable it to determine the direction of progression of the user and thus to select between feature items of a feature in dependence on the direction of approach of the user. This is done, for example, for the features associated with openings 25 in order to select a feature item appropriate to entering a room. The IDs of feature items identified by the unit 57 together with the identity of the corresponding feature and the status of the automatic presentation flag of the feature, form a first part 66 of the response 65 to be sent back to the mobile device 31. Where the current location does not correspond to the active zone of any feature, the first response part 66 simply indicates this.

A second part 67 of the item-data response 65 is produced by the prediction unit 58 and comprises a list of the feature items most likely to be needed in the near future by the mobile device 31; for each such feature item, the second response part 67 includes the feature ID, its type, size and probability of usage (discussed in detail hereinafter). Like the unit 57, the unit 58 uses supplied profile data to disregard feature items of features not of interest to the user or of a media type that cannot not be handled by the mobile device 31. The number of feature items identified in response part 67 is preferably limited (for example, to ten such items). The item-data response subsystem 56 then sends the response 65 back to the mobile device 31 of the user by using a return address supplied with the original location report 62 and passed to subsystem 56 by the manager 54.

Rather than having the prediction unit 58 provide a prediction each and every time the mobile device 31 sends a location report, it is possible to arrange for the prediction unit 58 only to operate when required by the mobile device 31 with the latter only requiring a prediction, for example, every nth location report or only after the user has moved a certain distance since the last prediction made by unit 58. Conveniently, the location report field used to carry the prediction-assist data is also used to indicate when a prediction is required by, for example, setting the field to a predetermined value when prediction is not required.

The item-data response received back at the mobile device 31 is processed by the visit manager 47. If the first part 66 of the response identifies a feature (thereby indicating that the current location of the user corresponds to the active zone of feature), the manager 47 updates the 'current feature' data in memory 45 to the feature identifier and item IDs in the first response part. These item IDs are also passed to the cache manager 45 and are used by the latter to request immediate delivery of these items from the server 53 of the service system to cache 44, if not already present in the cache. If the feature history data held by memory 43 relates to visited, rather than accessed, features, and if the feature identifier and item IDs in the first response part 66 differ from the most recent entry in the feature history list, the latter is updated with the feature identifier and item IDs from the first response part 66.

In the case that no feature is identified in the first part of the response 65, the 'current feature' data in memory 43 is set to null.

The manager 47 also determines whether the (first) feature item (if any) identified in the first response part 66 is to be immediately presented to the user, this determination taking account of the setting of the automatic presentation flag in the first part of the response, any user indication (stored, for example in the profile data) that all items are to be automatically presented, and any monitored indications of the user's interest in the currently-visited feature. Where a feature item identified in the first response part is to be immediately presented to the user, the manager 47 requests the item from the cache manager 45 (there may be a delay in the delivery of the item if it has not yet been received from the server 53). At the same time, if the feature history concerns accessed features the manager 47 updates the feature history with an entry corresponding to the feature identifier and item IDs forming the 'current feature' data; where the feature history although recording all visited features, provides for indicating whether a feature has been accessed, the manager updates the feature history accordingly.

With respect to the data contained in the second part 67 of the response 65, the visit manager simply passes this data to the cache manager 45 which determines whether or not to request from server 53 any of the items identified that are not already in the cache 44. The cache manger 47 in making this determination takes account of the probability that an item will be needed in the near future and the available cache space. The cache manager 45 may decide to create additional cache space by flushing one or more items from the cache and/or by reducing the space they occupy, as will be more fully described hereinafter.

In this manner, the cache manager 45 seeks to ensure that the next item requested by the visit manager 47 as the user progresses to the next feature will already be in the cache 44.

Following the processing of an item-data response by the visit manager, whenever a feature item is accessed (presented) either as a result of the visit manager 47 determining that the current feature is of interest to the user or as result of the user specifically requesting the item (for example, after inspecting the list of items associated with the current feature), then where the feature history data records accessed feature information, the visit manager 47 checks if the feature associated with the accessed item is the current feature and, if so, updates the feature history to record the feature as an accessed one if not already so indicated.

The visit manager can also be arranged to keep a list in memory 43 of the individual feature items accessed.

Having described the general operation of the mobile device 31 and service system 35, a more detailed description will now be given of some of the functionality embodied in the arrangement of FIGS. 1 and 2.

Pheromone Trails

The location reports provided by the mobile device 31 and passed to the pheromone trail subsystem 55 serve as virtual markers in the virtual world corresponding to the hall environment. These markers are stored by the subsystem 55 and used to build up trail and other useful information about utilisation of the corresponding real-world environment.

In general terms (that is, without limitation to the specifics of the embodiment of FIGS. 1 and 2), the virtual markers left in whatever manner in respect of a user can be given a variety of characteristics. For example, the markers can be arranged to reflect the nature of pheromones laid by social insects such as ants and have the following characteristics:
  the markers are left automatically;
  markers from different users are undifferentiated;
  markers have a value that diminishes both with time and with the distance from the point of marking;
  markers accumulate, that is the value of overlapping markers at a point is the sum of their values at that point;
  markers can be detected by all other users of mobile devices in the environment.

However, each of these characteristics represents a choice in some dimension and other choices are possible. For example:
  each marker may be left following a specific user action to do so in respect of that marker (that is, left deliberately);
  markers may be identified by their source;
  markers may be of different types to reflect different activities or intentions by the source;
  markers may be persistent;
  markers may be stored as distinct elements;
  perception of the markers may be limited to particular users.

Of course, a wide range of mixes of the above choices of characteristics (and of other characteristics) are possible and although the term "pheromone trail" is used herein to refer to the general arrangement of the deposition and use of virtual markers, this term should not be taken as implying that any particular characteristic is being implemented in respect of the arrangement concerned or that the use of the markers is related to delimiting a trail. Furthermore, it is to be understood that implementation of any particular characteristic is not tied to either one of the mobile device 31 or service system 35. Indeed, the service system is not essential for the implementation of a pheromone trail arrangement where the devices can communicate amongst themselves. Conversely, whilst some form of mobile device will generally need to be carried by the user to assist in determining the location of a user, the actual location determination of a user and corresponding marker deposition can be done by the service system 35; for example, the user's mobile device can be arranged to emit distinctive ultrasonic signals at intervals which are picked up by fixed receivers with time of receipt information then being used to determine the user's location and a corresponding virtual marker deposited in respect of the user. A system that does not require any device to be carried by the user for the purposes of location determination is also possible such as a camera-based system that can track the movement of an individual user through the hall 10 with the images produced by different cameras being correlated to follow the user as he/she passes from the field of view of one camera to that of another (this correlation can be aided by the use of face recognition technology). An alternative approach is to use pressure sensors to detect the footfalls of users with the individual footfalls being correlated to determine the most likely pattern of related footfalls corresponding to movement of single users (this correlation is facilitated if the pressure sensors also give a weight reading for each footfall).

Whatever the detailed characteristics of the markers, the effect of their deposition as users move around the physical environment is the generation of a marker "landscape" in the digital representation of that environment. The ridges, peaks, troughs and wells of this landscape reflect the number of markers laid in each part of the landscape and will typically (though not necessarily in all cases) also reflect the time elapsed since the markers were laid. The devices of other users are arranged to be able to sense this landscape enabling them to use various gradient and contour following applications to traverse it, for example to follow (or avoid) popular paths. In doing so, the intensity of marker accumulations can be indicated to users in a variety of ways; for example intensity levels can be represented through an audio signal whose loudness or frequency varied with that intensity or through a visual display.

Figure 5:
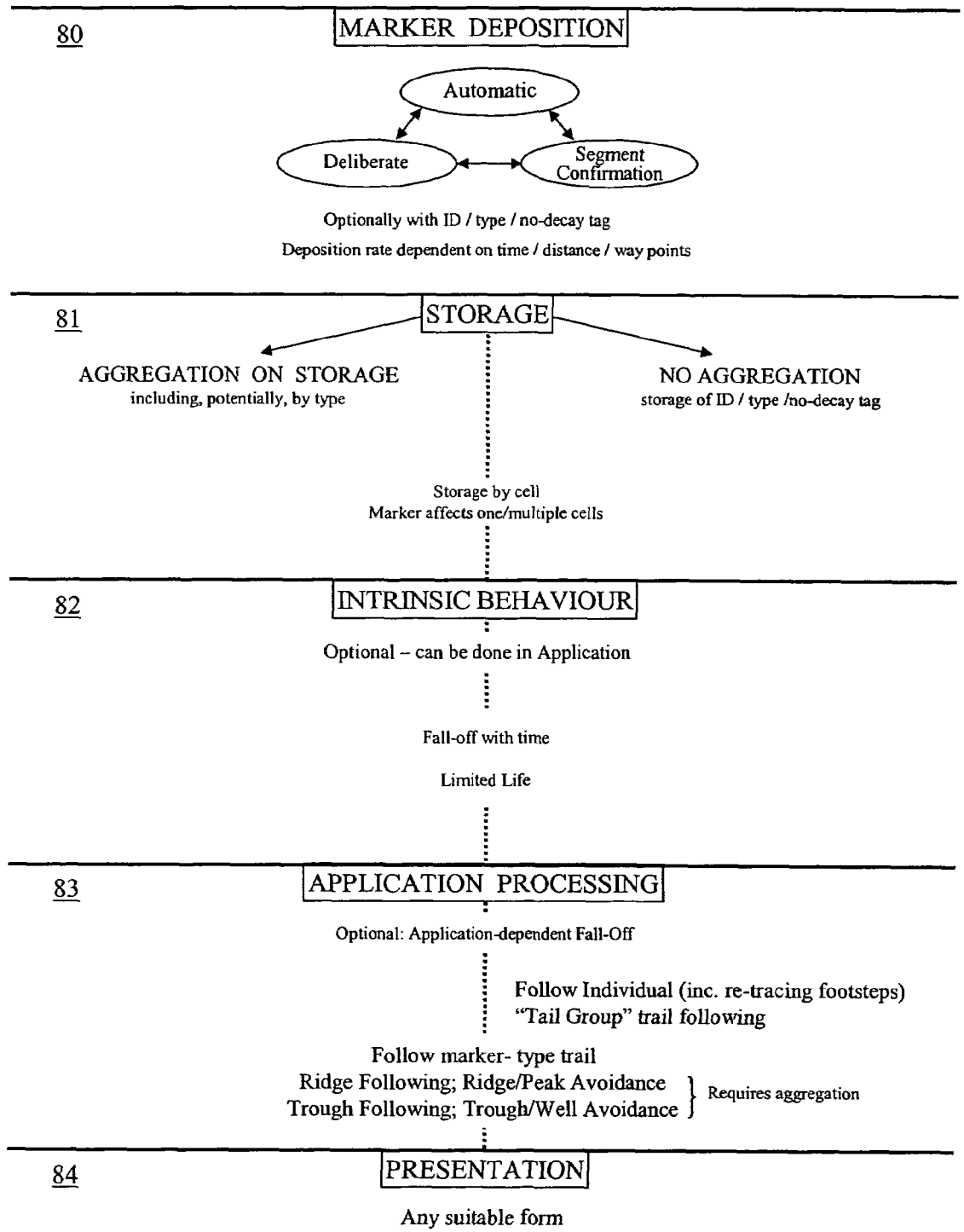
FIG. 5 is a diagram illustrating some of the choices available when implementing a pheromone trail mechanism such as provided by the mobile device and service system of FIG. 2.
Figure 6:
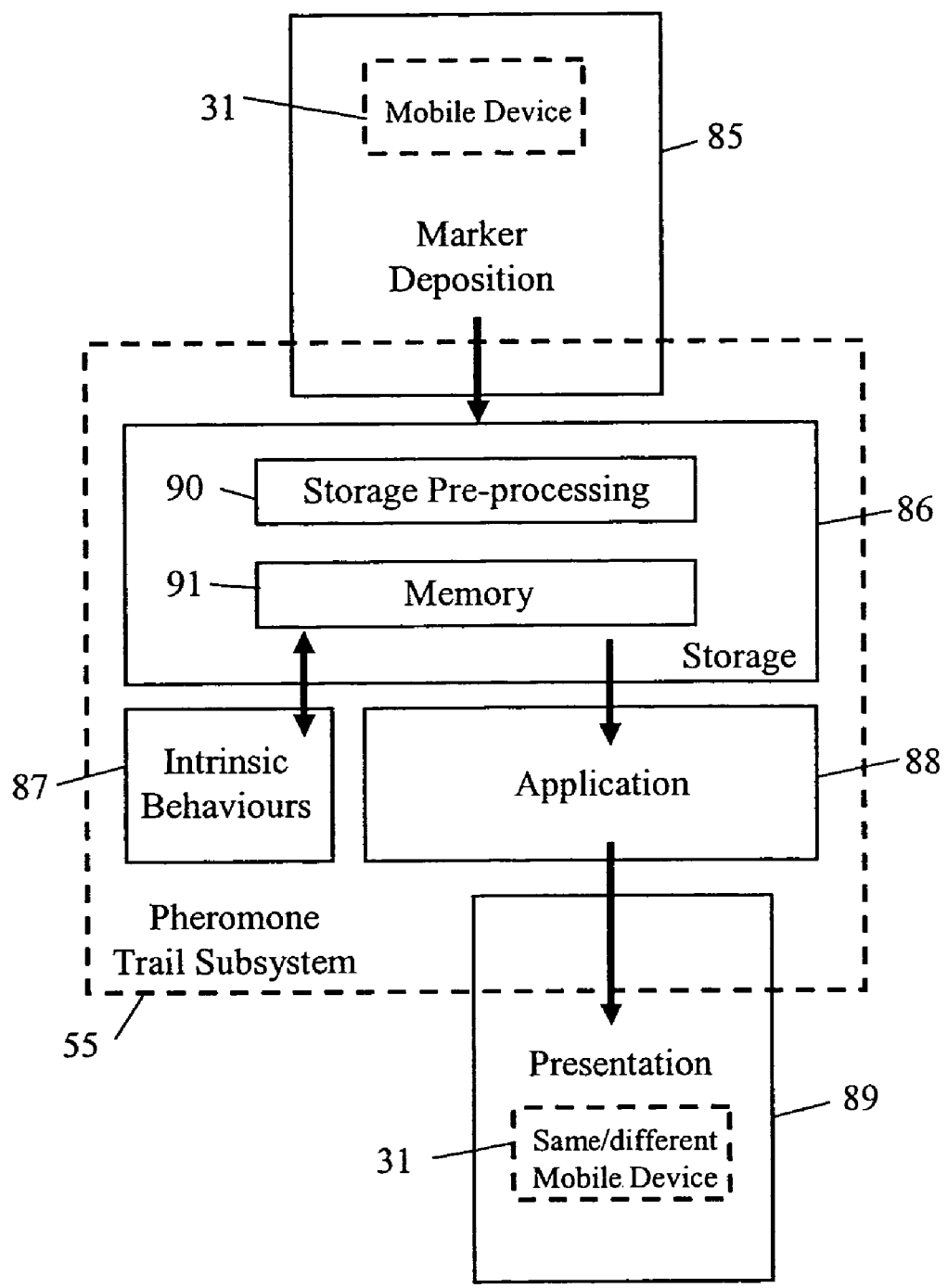
FIG. 6 is a diagram depicting the functional blocks involved in providing a pheromone trail mechanism.

FIG. 5 depicts some of the implementation choices available when constructing an embodiment of the pheromone trail arrangement, these choices being arranged by processing stage according to a division of the pheromone trail process into five such stages (other divisions being possible). The five stages depicted in FIG. 5 are marker deposition 80, storage 81, intrinsic behaviour 82 (applied to the stored data), application processing 83, and presentation. 84. These stages are carried out by corresponding functional blocks 85 to 89 depicted in FIG. 6 with the storage block 86 having two sub blocks, namely a storage pre-processing block 90 and a memory block 91. Also shown, in dashed lines, in FIG. 6 are the mobile device 31 and pheromone trail subsystem 55 of the FIG. 2 embodiment positioned to indicate where the functional blocks 85 to 89 are disposed in that embodiment.

Considering first the marker deposition stage 80 (functional block 85), marker deposition can be done automatically, by deliberate user-action per marker, or by deliberate user confirmation of an automatically-generated series of latent markers representing a trail segment. Where markers are deposited (or generated) automatically, the frequency of deposition/generation can be made time or distance dependent (with respect to the last marker) or can be arranged to occur at specific way points around the environment, for example, at virtual features (that is, when a user enters the active zone of the feature, with typically only one marker being deposited/generated per feature encounter). Depositing a marker when a feature is encountered does, of course, require the mapping between location and features to have first been carried out; this can be done either by arranging for this mapping to be effected in the user's mobile device or by arranging for the unit carrying out the mapping away from the device (for example, unit 57 in the FIG. 2 embodiment) to deposit a marker on behalf of the device.

However a marker is deposited/generated, each marker may have an associated user identifier and/or type indicator (indicating some special significance not specific to a user). In the case of there being more than one type of marker, either a single marker type can be associated with a user or multiple types of marker can be associated with the user. Where multiple marker types are associated with a user, different conditions can be specified for when each type of marker is to be deposited (for example, one type of marker could be deposited at regular intervals whilst another type only deposited when at a virtual feature). More than one type of marker can be deposited at the same time where appropriate and in this case it can be useful to avoid duplication of data by combining the different types of basic marker into a single compound marker with attributes defining the types of basic marker represented by the compound marker.

Each marker may also have a tag to indicate a desired decay behaviour—for example, where, by default, a marker is arranged to decay, a no-decay tag can be included which if set (or "true") indicates that the marker concerned is not to be given the default behaviour of decaying in value with time. Of course, it is possible to view the decay tag simply as a marker type indicator with markers tagged for decay being decay-type markers and markers tagged not to decay being no-decay type markers.

The main choice presented at the storage stage 81 (functional block 86) is whether a marker is to be aggregated with previously stored markers deposited at the same location or stored as an individual marker along with any associated data. Whilst aggregation produces useful information, storing in an un-aggregated form has the advantage of preserving the maximum amount of raw data whilst leaving open the option to later on retrieve a copy of the data for aggregation; the disadvantages of not aggregating initially are the much greater storage capacity required and the delay in later on obtaining aggregated data. Where aggregation is effected, this can be done across all types of marker or for each type of marker separately. Typically aggregation is done by adding an initial strength value to the aggregated strength value already stored for the same "location cell" as that in which the marker was deposited where a location cell corresponds to a specific area of the real-world environment. Rather than a marker being allocated to one location cell only, the strength of the marker can be divided up between the nearest cells in proportion, for example, to the distance between the point of deposition of the marker and a center point of each of the nearest cells. The initial strength value of a marker can be made dependent on the type of marker concerned where multiple marker types are present.

The intrinsic behaviour stage 82 (functional block 87) applies behaviours to the aggregated or non-aggregated markers. For example, the aggregated or non-aggregated marker strength can be reduced with time with the rate of strength decay being dependent on marker type (the decay rate can be of any suitable form such as by a fixed amount per unit time or a by fixed proportion of the remaining strength per unit time). Where a marker is individually stored, the marker can also be given a limited life determined as expired either when its strength falls below a certain level or when the marker reaches a certain age (for which purpose, a time-of-deposition time stamp can be stored along with the marker). Applying intrinsic behaviour is done, for example, by a process that regularly scans the memory block 91, reviewing and modifying its contents as necessary. The intrinsic behaviour stage 82 may not be present either because no relevant behaviours are being implemented or because they are applied as part of the applications processes for using the stored data.

The application stage 83 (functional block 88) uses the stored data to carry out specific application tasks and may also apply behaviours, such as marker strength fall off with time, to the data copied from storage where such behaviours have not been applied earlier to the stored data itself. Typical application tasks include:

where markers of one or more types are aggregated (either on storage or by the application), determining and following a "ridge" of the highest-strength marker aggregations corresponding to the most popular trail through the environment; a related application is one where a "trough" of the weakest (or zero) marker aggregations is followed;

where markers are stored individually with user IDs and a strength fall-off with time behaviour has been applied to the stored data, following a trail left by a specific user, the strength of the relevant markers indicating the direction of movement along the trail;

where markers are stored individually with user IDs and deposition timestamps enabling the trail laid down by each user to be followed, predicting or proposing a user's future movement on the basis of the movement forward from that user's current location of previous users whose trail leading to this location matches closely with the location tail of the subject user (that is, with the locations of the last several markers deposited by the current user);

where markers are deposited on encountering a virtual feature and the markers are aggregated by type with a decay that is exponential in form with a time constant of half a day for example, determining the most popular features of a given type for the current day by determining the strongest aggregation of markers of that given type.

It should be noted that different applications may call for different marker strength decay rates. This can be accommodated in a several ways—for example, each marker that is deposited can be split into multiple copies with each copy being used for a particular application and decayed (either as an intrinsic behaviour or by the application) at an appropriate rate. A variant of this approach is to give a single marker multiple strength attribute values, each value being associated with a different application and being decayed at a rate appropriate for the application concerned either as an intrinsic behaviour or by the application; this is equivalent to there being a respective marker type per application with markers of several different types being deposited at the same time in a compound marker (of course, it would also be possible to actually deposit discrete markers per application type).

As regards the presentation stage 84 (functional block 89), how the output of an application is presented to a user will depend on the nature of that output and the interface modalities available. Typically, where an application task has determined a trail to follow or the most popular features, this can be presented to the user on a map display whilst if an application is arranged to provide real time guidance along a path, this may be best done using audio prompts.

Implementation details of the functional blocks 85-89 for any particular combination of the available choices discussed above will be apparent to persons skilled in the art. It should be noted that multiple combinations of choices can exist together; for example, markers can be arranged to be deposited by a mobile device both at fixed time intervals and every time a feature is encountered and a marker can be both aggregated upon storage as well as an individual copy being kept. Thus in one implementation, an array data structure is used to define an X-Y array of location cells with each cell mapping to a respective area of the real world environment (hall 10) and being used to hold, for each marker type, both an aggregated strength value for the markers of that type deposited at locations covered by the real-world area to which the cell maps, and a pointer to a linked list of individual records for those markers which are still alive (that is, not time expired).

With respect to the embodiment of FIGS. 1 and 2, the pheromone trail subsystem 55 is arranged to store markers of three different types, namely:

"tour" markers deposited in the form of location reports 62 by a tour guide and serving to delineate a proposed route around the hall. These markers are each deposited by deliberate act of the tour guide and have an associated "no-decay" tag as well as an indicator of their type. Preferably the type indicator has an associated sub-type that identifies a specific tour. Since each specific tour will have only one set of markers associated with it, storing the tour markers on the basis of aggregating markers of the same type and sub-type deposited in the same location is the same as storing the markers individually and either approach may be adopted The stored markers are not decayed with time.

"normal" markers deposited in the form of location reports 62 by the mobile devices 31 of visitors, these markers being deposited at fixed time intervals and being subject to aggregation on storage with other markers of this type deposited in the same location cell (that is, an initial strength value associated with a newly deposited marker is added to the aggregated strength value associated with the marker aggregation for the cell in which the new marker has been deposited). The strengths of the marker aggregations are decayed with time but over a long time period. These aggregated "normal" markers serve to indicate the most popular trails, reflecting both the number of users traversing these trails and the time spent on them.

"feature" markers deposited by the unit 57 each time it determines from data in a location report that the device sending the report is in the active zone of a feature. If, as is preferred, the prediction assist data in the location report contains current feature data, then deposition of a feature marker can be restricted to when a user first enters the active zone of the feature, this being achieved by comparing the identity of the current feature as determined by unit 57 with the current feature noted in the location report and only depositing a marker if the two differ. The feature markers are aggregated in feature cells held by the unit 55 and are decayed over a period of an hour to give a picture of the current popularity of the features. Feature cells are simply location cells covering an area corresponding to the active zone of a feature. In a variant, the deposition of a feature marker is only effected when a user is in the active zone of a feature and requests presentation of a related feature item.

The stored markers are put to use for route planning/following, feature popularity review, and prediction purposes. With respect to route planning, when the visit manager 47 of a mobile device 31 requests a route from the route planner 59 of the service system, the latter can ask the application task block 88 of the pheromone trail subsystem 55 to access the stored marker data and propose a possible route based either on the tour markers or the aggregated normal markers. Thus, the route planner, where provided with a subject of interest to the user by the visit manager 47, can be arranged to map this subject to a particular tour sub-type and then retrieve the set of locations of the corresponding tour markers stored by the subsystem 55; these locations are then used to provide a route plan back to the mobile device 31. As described above, no sequence information is stored with the tour markers and whilst this will generally not be an issue, it is possible to provide for the tour markers to carry sequence information in a number of ways, the simplest of which is to associate a sequence number with each tour marker as it is deposited, this number being incremented for each successive marker and being stored along with the marker. An equivalent way of providing sequence information is to incrementally increase/decrease the strength value assigned to each marker as it is deposited; since the tour marker do not decay, this strength value remains and effectively serves as a sequence number indicating the direction of progression of the tour.

The route planner 59 can be arranged to request the subsystem 55 for the most popular route around the hall 10 as indicated by ridges of higher-strength accumulations of normal markers, or for the least crowded route as indicated by troughs of zero or low-strength accumulations of the normal markers. Of course, the route planner 59 will typically have been requested by a user to provide a route that takes the user to features relating to a particular subject or even to a set of user-selected features; if the route planner decides that there is no relevant pre-planned tour it can use, or if the user has specifically asked for a popular or a least crowded route, then the route planner will use the normal-marker aggregations to aid it in planning a route between the selected features. This can be done by first selecting an order in which to visit the features and then asking the application task block 88 to provide the most popular/least crowded route between each successive pairing of features in the order they are to be visited. Alternatively, the actual order of visiting of the features, as well as the route between each feature, can be determined according to the peaks and troughs of the accumulated normal marker landscape, preferably with account being taken of the total distance to be traveled by the user. In this case, since the application task block 88 has more immediate access to the stored marker accumulations, it may be appropriate for the route planner to hand over the whole task of planning a route to the task block 88.

Rather than determining a route by following ridges or troughs in the accumulated-marker landscape, the route planner can be arranged to determine a route by avoiding ridges or troughs. In relation to route determination, it is to be understood that the term "ridge" includes the limit case of a "peak" and the term "trough" includes the limit case of a "well".

An image of the virtual landscape formed by the location-dependent aggregations of markers mapped to a representation (such as a plan) of the hall 10 can, of course, be passed to the mobile device 31 for presentation to the user.

Another possible usage of the pheromone trail subsystem 55 in respect of providing route information involves the deposition by a first user of user-specific markers that are not aggregated but are arranged to decay in strength over a period of an hour or so. These markers would enable a second user to request the route taken by the first user (for example, by means of a request sent from the visit manager 47 of the second user's mobile device to the route planner 59), the markers deposited by the first user then being accessed to determine the route taken by the first user and their direction of progression as indicated by the current strengths of the markers. This service (suitable for a parent wanting to track a child) can be made private with only the users involved being able to access the relevant marker data and can be provided as a fee-based service.

A similar type of usage involves all members of a group having markers of a type specific to that group, the markers being aggregated on storage. This would enable an overview to be obtained of what the group did during a visit and if the markers concerned did not decay (though typically given a lifespan limited to the day of the visit) and were deposited at fixed time intervals, it would also enable the popularity of different visited features to be discerned. Preferably, the group markers are deposited in addition to normal markers rather than as an alternative to the latter.

Although in the foregoing examples of the use of the pheromone trail system in the embodiment of FIGS. 1 and 2, the route information derived from the stored markers has been passed back to the mobile device for storage in the visit data memory 43 as a route to be followed, it is also possible to have a more dynamic interaction between the mobile device and the stored marker data. Thus, for example, the mobile device 31 can be arranged to query the pheromone trail subsystem 55 continually as to the next location to move to in order to follow a ridge or trough of the marker landscape or to follow a trail laid down by a specific user.

With regard to the use of the deposited marker data for feature popularity review, if a user wishes to ascertain the current relative popularity of the features (or, in user terms, of the exhibits with which the features are associated), the user causes the visit manager 47 to send a request to the pheromone trail subsystem 55. The task block 88 of the subsystem 55 then accesses the feature marker accumulations of the feature cells and uses the strengths of these accumulations to determine the current relative popularity of the features. This popularity data is then returned to the requesting mobile device for presentation to the user. If a longer term view of the popularity of the features is required, then the task block 88 accesses the normal marker aggregations for the feature cells, these aggregations having a longer decay period and, unlike the feature marker accumulations, having a strength that reflects the dwell time at each feature as well as the number of visits.

In respect of use of the deposited marker data for prediction purposes, this involves using the current location or location tail of a user to make predictions as to where the user is likely to go next having regard to what others have done as indicated by the relative strengths of the accumulations of normal markers in location cells adjacent the one in which the user is currently located. If location tail data is available, the strengths of marker accumulations in location cells just visited by the user (and possibly also of the cells on either side of such cells) can be scaled down to reflect the fact that the user is less likely to visit those cells; however, if the geography of the hall or the layout of features of interest to the user is likely to cause the user to turn around, then such scaling down is not effected. Making predictions of the user's future path in this manner is carried out by the application task block 88 of the pheromone trail subsystem. As will be further described below, this future path prediction capability can be used by the prediction unit 58 to determine what feature items are likely to be needed in the near future.

It will be appreciated that many other applications are possible for the pheromone trail arrangements discussed above.

With respect to management of the pheromone trail information by the exhibition hall staff, the use of tour markers for defining tours has already been mentioned. However, other management techniques are also possible. For example, as an alternative to using tour markers, or in order to modify trails such as those defined by aggregation ridges, a special marker type that has a very high initial strength can be defined and associated with a tour guide—this guide then traverses the hall on a desired path depositing the high-strength markers along the way. These high-strength markers effectively serve to swamp existing trail information to define new trails. A reverse effect can also be provided by defining a negative strength marker type to wipe out (or at least reduce) aggregated strength values along particular paths.

Caching of Feature Items

As described above, the mobile device 31 is arranged to preemptively cache feature items in cache 44 in dependence on their respective probabilities of being required in the near future; these probabilities being determined by the prediction unit 58 of the service system 35 using information (in particular, the prediction-assist data) provided in the location reports from the mobile device 31. In this manner, the latency inherent in fetching feature items from the feature item server 53 only when needed is avoided.

The prediction unit 58 can operate on the basis of any one or more of a variety of different techniques for predicting which feature items will be needed in the near future. A number of these techniques are described below, these techniques being divided into two groups, namely a first group A covering techniques that do not use visit data concerning previous users, and a second group B that rely on such previous-users visit data.

It should be noted that in the following the probability of an item being needed (also referred to as the probability of usage of the item), is used to encompass both the probability of an item being definitively requested (that is, not on a probabilistic basis) for delivery to the mobile device and the probability of an item being accessed at the device by the user. The fact that these two probabilities are different in the FIG. 2 embodiment is because the service system and mobile device operate on the basis that all items associated with a currently visited feature are downloaded into the cache 44 of the device, regardless of their probability of being accessed by the user. The probability that a particular item will be requested for delivery to the device is thus the same as the probability that the user will visit the associated feature. Had the service system and mobile device simply been arranged to non-probabilistically request delivery of an item only when accessed by the user, the probability of an item being requested for delivery would be the same as the probability of that item being accessed. Notwithstanding the fact that in the FIG. 2 embodiment all items associated with a current feature item are requested for delivery, prediction of what items may be needed in the near future need not be restricted to use of the probability of a feature item being non-probabilistically requested (as indicated, for example, by the probability of the associated feature being visited), and can alternatively be based on the probability of the user accessing a particular item (or of accessing at least one of the items associated with a feature, all these items then being considered as having the same probability of access). Consolidating the foregoing, the probability of usage of an item can be based on the probability of a feature being visited or accessed, or of a feature item being accessed by the user or non-probabilistically requested for delivery.

Furthermore, regardless of the prediction technique being used, the prediction unit 58 may, as already mentioned, filter out from its prediction process all feature items that do not relate to a subject of interest to the current user or are of a media type incompatible with the mobile device of that user. In fact, rather than filtering out all feature items concerning subjects in which the user has not expressed interest, the probabilities associated with these items regarding their likely use in the near future can be appropriately adjusted to take account of the user's apparent lack of interest in them.

A—Prediction not Based on Visit Data Concerning Previous Users

1. Adjacency of Features to Current Location (Optionally Weighted Against Wake Features)

This is the simplest prediction technique and in its basic form takes the current location of the user and determines the closest features (typically by reference to the data held in the feature data store). The probability of usage of the feature items associated with these features is based on the probability of the features being visited and is thus set to fall off in dependence on the distance of the feature concerned from the user's current location. For example, all features within a 30 meter radius of the user's current location are determined and the probability of usage of an item associated with a feature r meters away is set to:

(30−r)/30

Figure 7:
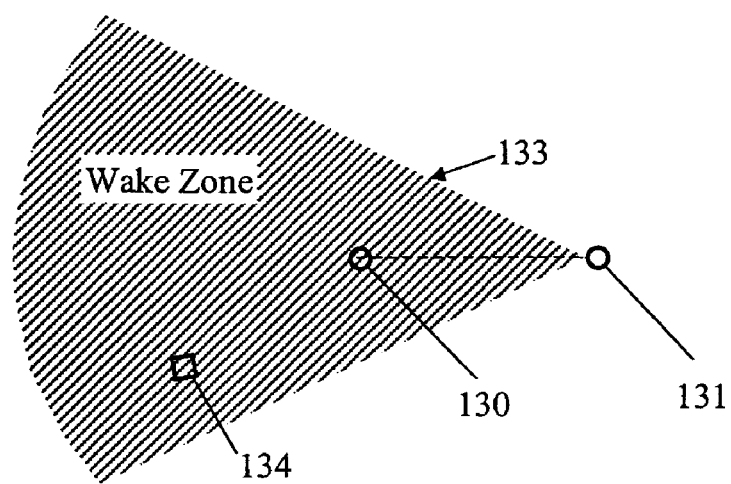
FIG. 7 is a diagram depicting a wake zone behind a user progressing around the FIG. 1 hall.

This basic technique can be modified to reduce the probabilities of usage of feature items associated with features that the user has recently passed (and is therefore less likely to visit in the immediate future). These features, referred to below as "wake" features, are identified by the prediction unit 58 using location history data of the current user—in present embodiment this data is supplied in the form of the user's location tail provided as part of the prediction assist data. As depicted in FIG. 7, the immediately preceding location 130 (or locations) of the user are used, together with the user's current location 131 to determine a "wake" zone 133; the probability of usage of any feature item associated with a feature 134 lying in the wake zone 133 (that is, a wake feature) is then weighted by a factor between 0 and 1. It will be appreciated than the wake zone 133 could be divided into sub-zones each having a different associated weighting factor according to a perceived reduced probability of usage of feature items for features in such sub-zones.

2. Adjacency of Features to Planned Route

Figure 8:
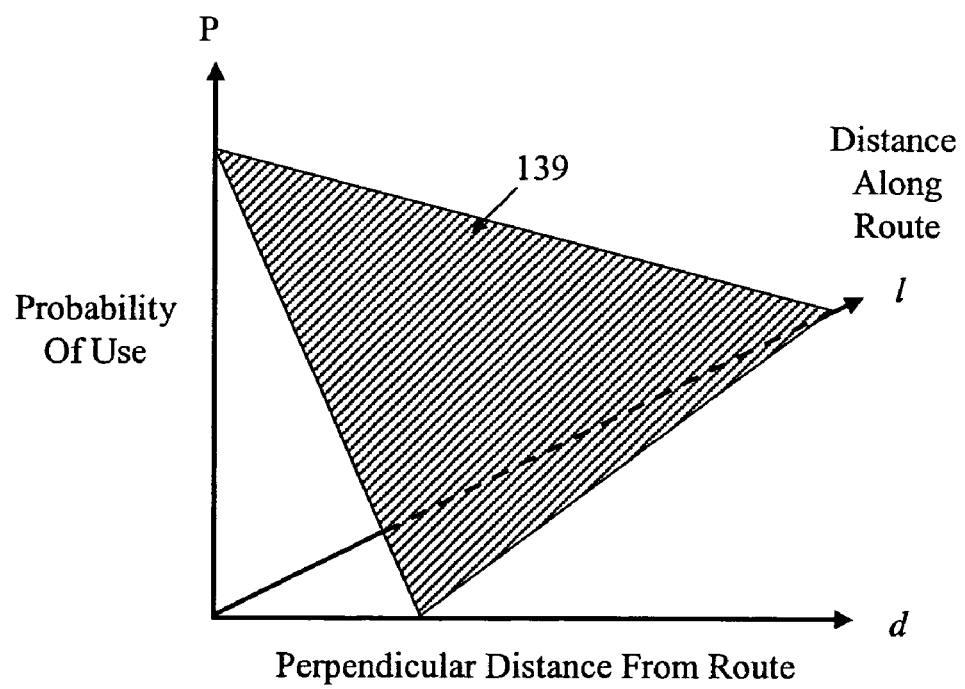
FIG. 8 is a diagram illustrating the fall-off in allocated item usage probability with distance along and to the side of a movement track.

If the user is following a planned route and data about the next portion of this route is included in the prediction assist data, the prediction unit 58 can use the route forward of the user's current location to determine the features next to be encountered along the route (either on the route or adjacent to it). The probability P of usage of a feature item associated with such features is again based on the probability of a feature being visited and is set according to both the distance l of the feature along the forward route (the greater the distance, the lower the probability) and the perpendicular distance d of the feature off the route (again, the greater the distance the lower the probability but this time the fall-off rate is much faster than for distance along the forward route). FIG. 8 illustrate, by way of example, a linear fall off of probability with distances l and d giving a defining plane 139.

It may be noted that where the route being followed is a standard route for which route data is held by the route planner 59, then the route data included in the prediction assist data can simply be an identifier of the route, the prediction unit using this identifier to retrieve the route details from the route planner 59. It may also be noted that a planned route may be defined in terms of features to be visited rather than as a path; in this case, the probability of usage of feature items for features on the route is set simply by their order from the current point onwards; other features not on the route can still be included in the prediction according to their adjacency to the features on the route (or to a direct path between them). It may be further noted that having a planned route stored in visit memory 43 is not necessarily to be taken as a sufficient condition that the user is following a planned route; one or more additional conditions may be required such as, for example, the user is actively using the path guide unit 49 to follow the planned route, or the last two/three features visited have all been on the planned route. The determination as to whether a planned route is being followed is preferably made in the mobile device 31.

3. Adjacency of Features to Future Track Predicted from Movement History

Where the user's recent movement history is available to the prediction unit 58 (for example, as a result of the user's location tail being included in the prediction data), then the unit 58 can use this information to predict the user's track in the immediate future. Thus, if the user's location tail is available to the prediction unit 58, a smooth curve passing through the locations in this tail can be determined and continued to predict the user's future track. This track can then be used in much the same manner as a planned route as described above, that is, the features lying on or near the track are identified and the probability of usage of feature items associated with these features is set in dependence both on the distance of the features concerned along the track and on their distance off the track (c.f. FIG. 8).

Rather than predicting the user's future track on the basis of their location tail, this track can be predicted from a knowledge of the user's current location and direction of moving as determined for example, by the direction of facing of the user's body as measured by an electronic compass carried by the latter.

B—Prediction Based on Visit Data Concerning Previous Users

This group of prediction techniques use visit data concerning previous users. This visit data can be collected in any suitable manner. For example, the visit data can be obtained by storing in a mobile device 31 during a visit, time-ordered lists of all locations and features visited, and all feature items accessed and where they were accessed. At the end of the visit, the stored data is uploaded to the service system for organization and use by the prediction unit 58. It is alternatively possible to arrange for the visit data to be collected by the service system as a user progresses through a visit. Furthermore, where prediction is based on location/feature trail information, the pheromone trail subsystem 55 can be used to provide the required visit data.

4(a). Same Location—Track Prediction—Feature Prediction (Optionally Weighted Against Wake Features)

This prediction technique simply uses the user's current location to predict where the user is likely to go next on the basis of where previous users have gone from this location (the prediction unit 58 may, for example, query the pheromone trail subsystem for such information). Given the most likely future track(s) of the user, the features that will be encountered along or near the track are determined followed by the probability of usage of the associated feature items; this is effected, for example, in a manner akin to that used in prediction technique (3) above. If more than one future track is considered, the probability of use of each track is used as an additional weighting factor for the probability of usage of the feature items. A weighting can also be introduced to reduce the probability of usage of feature items associated with wake features as described above with reference to prediction technique (1).

4(b). Same Location—Direct Prediction of Feature/Feature Item (Optionally Weighted Against Wake Features)

Rather than predicting feature/feature item usage indirectly by first predicting a future track for the user based on the tracks taken by previous user's from the current location, it is possible to take the user's current location and use it to predict directly from the previous-users visit data what features will probably be visited or accessed next—or even more directly, what feature items are likely to be visited/delivered to the mobile device/accessed in the near future. This is done by organizing the previous-users visit data on the basis of what features are most commonly next visited or accessed or what feature items are next delivered to or next accessed by users who have been at the current location. Again, a weighting can be introduced to reduce the probability of usage of feature items associated with wake features.

5(a). Same Recent Movement History—Track Prediction—Feature Prediction

This technique is similar to prediction technique (4a) but makes its future track prediction based on where previous users with the same recent movement history (typically, with the same location tail) have gone from the current location. Of course, since previous locations visited by the user are inherently taken into account by this technique, it is inappropriate to adversely weight the usage probabilities of items associated with wake features as was optionally done for prediction technique (4). It should be noted that in order to be able to identify previous users with the same recent movement history, the movement data of previous users needs to be available in an un-aggregated form.

5(b). Same Recent Movement History—Direct Prediction of Feature/Feature Item

This technique is similar to prediction technique (4b) but uses visit data from previous users with the same recent movement history (typically, with the same location tail) in order to determine what features are likely to be visited or accessed in the near future, or what feature items are likely to be visited/delivered to the mobile device/accessed in the near future.

6. Same Most-Recently Visited Feature—Prediction of Feature/Feature Item (Optionally Weighed Against Recently-Visited Features)

Figure 9:
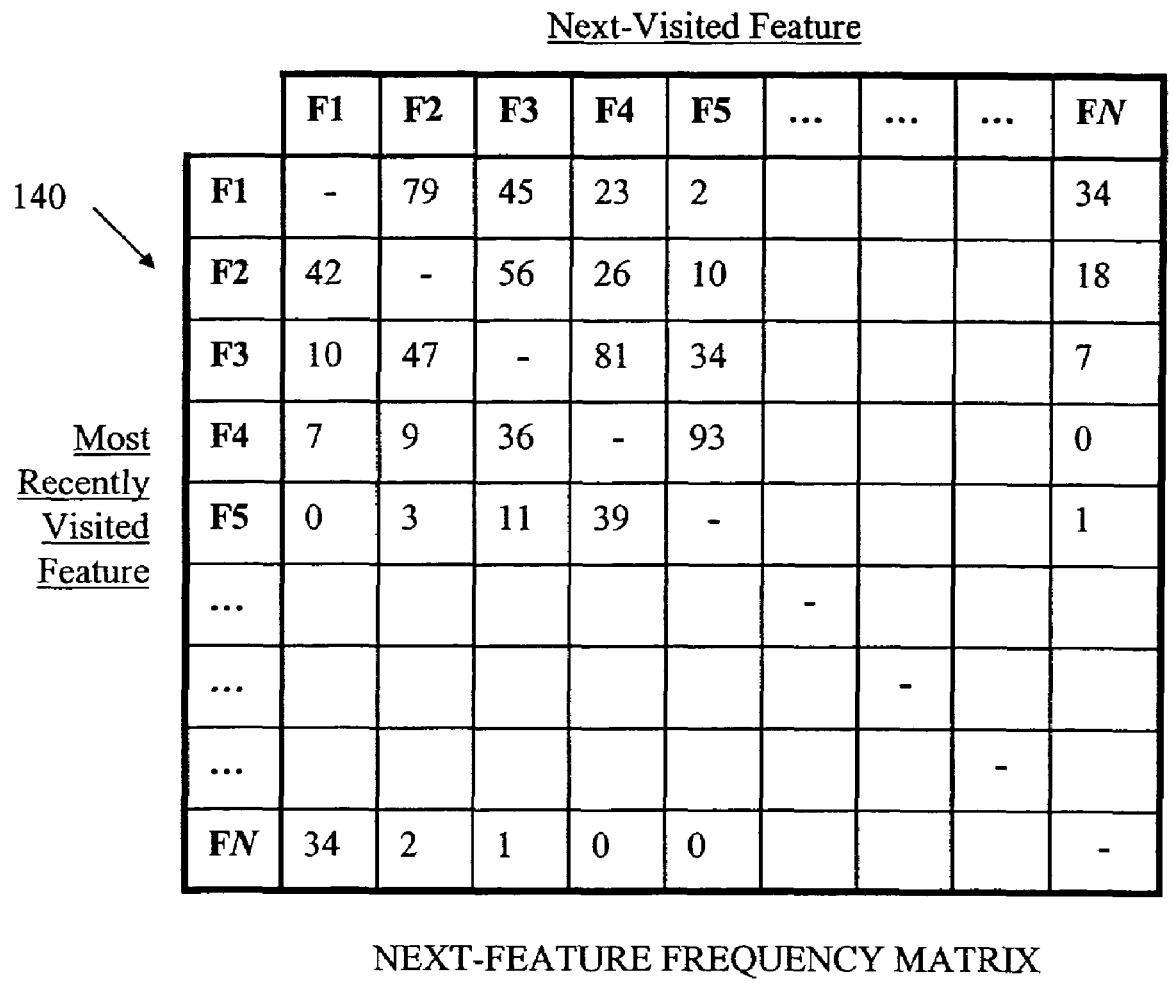
FIG. 9 is a table showing for each of multiple virtual features located around the FIG. 1 exhibition hall, the likely next feature to be visited from the current feature based on counts of what previous users have done.

This prediction technique does not use location data but bases itself on visited feature data. More particularly, the prediction unit 58 uses the current feature identified by the location-to-feature translation unit 57 or, if the user's current location does not correspond to a feature, the user's most-recently visited feature as identified in the prediction assist data included in the latest location report. Given this feature, the prediction unit 58 accesses a stored table 140 (see FIG. 9) which for each feature F1 to FN keeps a count of the next feature visited by each previous user. These count values enable the unit 58 to determine the probability of each feature being the next feature visited, these probabilities then being applied to the feature items associated with each feature as the probability of usage of those items. If the prediction assist data includes the feature tail of the user, this can be used to reduce the probabilities associated with the features in the user's feature tail.

The table 140 lends itself to dynamic updating since if the unit 57 identifies a feature—for example feature F(N–3)—that is different to the most-recently visited feature—for example, feature F5—identified in the prediction assist data, this indicates that the user has moved from the feature F5 to the feature F(N–3) so that the count value in the table cell at the intersection of row F5 and column F(N–3) should be incremented to reflect this.

It should be noted that a single access to the table 140 will only give probabilities regarding the next feature to be visited. However, it is possible to look further ahead by accessing the table again in respect of the most-probable next feature (or features) in order to derive probabilities in respect of the next-but-one feature to be visited. By repeating this process, a forward-looking probability graph can be built up to any required depth.

It should also be noted that it is possible to provide table 140 with the next-visited feature probability data replaced by next-accessed feature data where, as explained above, an accessed feature is a feature having at least one associated item that has been accessed—presented to—the user. Alternatively, the next-visited feature count data in table 140 can be replaced by probability data about the next feature item visited/requested for delivery (or delivered) to/accessed by, the user after the current/most-recent feature visited.

7. Same Most-Recently Visited Feature History—Prediction of Feature/Feature Item This prediction technique matches the user's recent visited-feature history (their visited-feature tail) to the visited-feature histories of previous users visiting the user's current or most-recently visited feature. Having identified previous users with matching feature tails, the prediction unit 58 analyses the visit data of these previous users to determine the probabilities associated with the user next visiting the other features and thus the probability of usage of the associated feature items. As with prediction technique (6), rather than predicting the next feature to be visited, the previous visit data can be organized to enable the unit 58 to predict the next accessed feature (and thus feature items likely to be needed) or the next feature item visited/requested for delivery (or delivered)/accessed.

8. Same Most-Recently Accessed Feature—Prediction of Feature/Feature Item (Optionally Weighted Against Accessed Wake Features)

This prediction technique is similar to prediction technique (6) but is based on accessed features rather than visited features. It should be noted that since the location-to-feature translation unit 58 does not know whether any feature it identifies is an accessed feature, the prediction unit works on the basis of the most-recently accessed feature as identified in the prediction assist data it receives from the user.

Rather than predicting the next feature to be accessed, the previous visit data can be organized to enable the unit 58 to predict the next feature to be visited (and thus feature items likely to be needed) or the next feature item visited/requested for delivery (or delivered)/accessed.

9. Same Most-Recently Accessed Feature History—Prediction of Feature/Feature Item This prediction technique is similar to prediction technique (7) but is based on accessed features rather than visited features. Again, rather than predicting the next feature to be accessed, the previous visit data can be organized to enable the unit 58 to predict the next feature to be visited (and thus feature items likely to be needed) or the next feature item visited/requested for delivery (or delivered)/accessed.

It will be appreciated that since each feature item can be represented by a respective feature, where the foregoing prediction techniques involve features the same techniques can be applied directly to feature items provided the latter have any required associated parameter data, such as location. Thus, the prediction techniques (1), (2), (3), (4a) and (5a) which all involve determining the closeness of features to a location or track, can equally be implemented by determining the closeness of individual feature items to a location or track. Similarly, techniques (6) to (9) can be applied by accessing the previous-users visit histories in respect of the same visited/accessed feature item/feature-item tail rather than the same visited/accessed feature/feature tail (in this context, a "visited" feature item is one where the user has visited the location associated with the location).

Where an above-described prediction technique is based on determining the probability of visiting/accessing a feature, then instead of using this probability as the probability of usage of all the feature items concerned, it is alternatively possible to set the usage probability of each feature time individually by weighting the feature-related probability according to the relative popularity (in terms of actual presentation to the user) of the item concerned with respect to other items associated with the same feature-provided, of course, that data about relative popularity is made available to the prediction unit 58.

All of the above prediction techniques can be implemented fully in service system 35, split in any appropriate manner between the service system 35 and the mobile devices 31, or fully in the mobile devices 31, even if based on the visit histories of previous users. Thus, for example, where prediction is done on the basis of previous visit histories but there is no service system 35, each mobile device can be arranged to store all its past visit histories and to supply them to other devices on request. As another example, the FIG. 2 embodiment can be modified by arranging for the prediction unit 58 simply to provide the mobile device with the probabilities of features being visited/accessed, it then being up to the mobile device (in particular the cache manager 45) to translate features to feature items and request such items according to the probabilities associated with the corresponding features; this, of course requires the cache manager to have access to information about the association between the features and feature items and such information can conveniently be stored in memory 43. Rather than the cache manager 45 requesting individual items from the server 53 when effecting pre-emptive caching, it can supply a feature identifier to the server 53 which then returns all the feature items associated with the feature concerned.

Additional prediction techniques to those described above are also possible. Also, the above-described pre-emptive caching arrangement can equally be applied where the features items are being supplied to the cache 44 from a local storage device such as a DVD drive rather than from a remote resource over a wireless connection.

It is also possible to control loading of items into the cache 44 on the basis that they have not been identified as an item having a low probability of usage as determined using one of the above-described prediction techniques. In one implementation of this approach, the cache manager 45 is arranged by default to request from the server 53 all items associated with features within a predetermined distance of the user's current location (as determined, for example, by querying the feature data store 52); however, this default is overridden in respect of any item which, according to the prediction unit 52, has a probability of usage below a predetermined threshold value. In this example implementation, the prediction unit 52 is arranged to identify the low usage probability items based on the information received in the location reports 62 from the device 31, the identities of these items then being returned to the device 31 in a response message 65.

Other factors additional to item usage probability may be used to determine when an item should be loaded into cache. For example, the amount of free space in the cache can be used to control the threshold probability value below which items are not loaded into the cache—the fuller the cache, the higher this threshold is set.

Flushing the Feature Item Cache

An item retrieved by the mobile device 31 to the cache 44 will typically be retained in cache for as long as possible to be available for access by the user at any time including after the user has passed on from the feature with which the item is associated. However, since the size of the cache memory 44 will generally be much smaller than that required to store all available feature items, it will usually be necessary to repeatedly remove items from the cache during the course of a visit to make room for other features items. Items to be flushed from the cache are identified on the basis of a prediction-based indication of what items are unlikely to be needed again.

The above-described prediction techniques used for determining the probability of usage of feature items can also be used in determining whether a cached feature item should be flushed from the cache. The usage predictions can be used in any one or more of the following ways:

1). The item IDs and usage probabilities included in the second part 67 of the response message 65 returned to the mobile device 31 can be used to indicate whether an item has a probability of usage insufficiently high to justify it being maintained in the cache. This can be done by setting a probability threshold, known to the cache manager 45, below which items are to be flushed from the cache (or, optionally, they can be retained if there is no need to free up cache space). Of course, typically (though not necessarily) the second part of the response message 65 will only give the usage probabilities of a limited number of the available feature items, these being the items with the highest usage probabilities; in this case, an assumption is preferably made that all items not appearing in the second response part 67 have a usage probability below the aforesaid threshold and can therefore be flushed from the cache.

2). The prediction unit 58 can be arranged to include in a third part of the response message 65 the item IDs and usage probabilities of items which have low usage probabilities. The cache manager 45 uses these item IDs and usage probabilities to determine whether or not to flush the corresponding items from cache (if present). This determination is made, for example, by reference to a probability threshold below which items are to be (or can be) flushed. In fact, if the prediction unit 58 knows the value of this predetermined threshold, it can simply include in the third response part the IDs of items falling below this threshold. Of course, there may be a very large number of items with a low probability of usage—in particular, items associated with features that are distant from the user. Preferably, therefore, the prediction unit 58 restricts its determination of items with low usage probability by a filter adapted to tend to exclude items that are unlikely to be in the cache memory 44 of the user's mobile device. This filter can be based on the user's feature tail (only items associated with features in this tail have their usage probabilities assessed to ascertain if they are low), or the user's location tail (only items associated with features within a certain distance of this tail have their usage probabilities assessed to ascertain if they are low). Applying such a filter leaves open the possibility of a low usage probability item being retained in cache where that item is associated with a feature excluded by the filter. This can be avoided by arranging for the cache manager 45 to apply the same filter to all items in cache and then to flush all items not passing the filter, except those items identified in the first part of the response message 66 (or, optionally, those items associated with the same features as the items identified in the first response part). For the cache manager to operate in this manner it will need to know which items are associated with which features and this association data can be downloaded to memory 43 at the start of the visit.

3) The cache manager 45 can be arranged to request the prediction unit to provide it with the probability of usage of individually identified items currently in the cache and then determine whether or not to flush each such item based on the usage probabilities returned by the prediction unit 58 (for example, if an item has a usage probability below a predetermined threshold value, the item is flushed). In making its request, the cache manager 45 sends the prediction unit 58 any data that the latter needs to apply the prediction technique being used; this data corresponds to some or all of the data included in the most recent location report made by the mobile device 31. Depending on the prediction technique being used, the prediction unit 58 may need to extend the scope of its prediction operations to encompass the items concerned. Thus, for example, implementation of prediction technique (1) for a specified item requires first that the corresponding feature to be identified (in order to determine the location of the item) and then the probability of usage is determined—however, if the normal radius used in calculating probabilities according to this technique (30 meters in the example given above) is insufficient to cover all features, a greater radius—sufficient to cover all features—should be used for determining the usage probabilities of individual items. A preferred alternative is to assign a probability of zero to all items outside the normally used radius; in a similar manner, in techniques (2), (3), (4a) and (5a) the scope of enquiry can be limited to a next portion only of the planned/predicted/probable track of the user, any features not on or adjacent this next track portion being given a usage probability of zero. For prediction techniques that use count data in a manner analogous to that represented by table 140 in FIG. 9 (such as techniques (6), (8) etc.), determining the usage probability of any particular item (or possibly, its associated feature) is simply a matter of accessing the correct table row to look up the count value for the item/feature concerned as the next item/feature and using this count and the total count for the row concerned to determine the usage probability. Adaptation of the other prediction techniques for determining the usage probabilities of individual items will be apparent to persons skilled in the art.

A number of variants are possible to this third approach—for example, the cache manager 45 can provide feature identifiers to the prediction unit which then returns the probabilities of each of those features being visited/accessed; the cache manager then uses this information to make its determinations about whether to flush items associated with those features (the cache manager having access to information about the association between items and features). Another possible variant is to include in each (or selected) location reports, the item IDs of items in cache, the prediction unit then returning the usage probabilities of these items in a third part of the response message 65. A further variant is to restrict the enquiry about usage probabilities of items in the cache 44 to those items that have not been recently accessed by the user (as indicated by a last-access timestamp associate with each item).

All of the foregoing cache-flushing arrangements can be implemented fully in the mobile devices 31 (even if based on the visit histories of previous users), split in any appropriate manner between the service system 35 and the mobile devices 31, or implemented fully in the service system 35 (apart from the actual operation of flushing identified items).

Other factors additional to item usage probability may be used to determine when an item should be flushed from the cache. For example, the amount of free space in the cache can be used to control the threshold probability value above which items are retained in the cache—the fuller the cache, the lower this threshold is set. Another factor that can be taken into account is the time that has elapsed since an item of interest was accessed or, if no accesses have been made, since the item was first loaded into the cache; this factor can be used, for example as a weighting for a usage probability determined for the device—the longer the elapsed time, the smaller the weighting.

As regards when cache flushing is effected, this can be done (or tested for) each time a response message is received, or regularly as part of a garbage collection strategy, or simply when space is needed in the cache.

Transforming Cached Items

As an additional or alternative strategy to flushing items from cache, the cache manager can be arranged to increase the available space in the cache by transforming at least selected items already in cache 44 so that each takes up less space (fewer bytes of cache memory) than before. The selection of items to be transformed in this way is preferably done using the same prediction techniques and approaches to using the resulting usage probabilities as discussed above in relation to cache flushing; the timing as to when transformations are done can also be the same as discussed above for cache flushing Furthermore, in selecting items for transformation, other factors besides usage probability can additionally (or, indeed, alternatively) be taken into account; possible other factors include cache free space and time since last access (or time since loading if no accesses have been made).

In a preferred arrangement, when the probability of usage of a cached item falls below a first level it is subject to transformation to take up less cache space; if the probability of usage of the item should fall below a second level, less than the first level, the item is flushed from cache (regardless of whether or not it has been previously transformed to take up less cache space.

The nature of the transformation to which an item is subject will generally be either compression using any of a variety of standard techniques, or a deliberate degradation where the available presentation quality of the item is traded for a reduction in the amount of cache space occupied by the item. Degradation of the item in step (b) can be effected, for example, by at least one of:

- where the item comprises a sampled-media stream, reducing the sample rate and/or the number of bits used to represent each sample;
- selectively removing whole portions of the item (for example, replacing a long audio recording with just the first few seconds of its length);
- where the item is an image, reducing the resolution of the image;
- changing the format in which the item is represented.

The transformed item replaces the un-transformed version of the item in cache 44.

In a preferred embodiment, each cached item has an associated flag which is set when the item is transformed. This enables the cache manager 45 to tell whether an item has been transformed without examining the item in detail.

The reason to transform an item rather than flush it from cache is that it remains available to the user without the delay involved in having to fetch it from the server 53. For many applications, quick access to a reduced version of a media object item will be preferable to the user to slower access to the full version of the item.

In one preferred embodiment, upon an item being accessed for presentation to the user, it is retrieved from cache and presented without delay. At the same time as (or just before or just after) the item is first presented, the cache manager 45 checks the flag associated with the item or otherwise makes a determination as to whether the item has been transformed from the version originally received from the server 53. If the item has been transformed, the cache manager 45 requests the original version from the server again and when this version is received, it is substituted for the transformed version of the item being presented to the user. Where the item concerned is a streaming media item, the newly-received original version of the item is accessed for presentation at the point in the media stream currently reached during presentation of the transformed version of the item to the user.

Whilst it may normally be expected that an item loaded into cache 44 from server 53 will spend some time in cache in its un-transformed form before being selected for transformation, this is not necessarily the case. More particularly, an item received at the mobile device may already satisfy the condition set for selecting an item for transformation; in this case, the item is transformed immediately it is received.

Distributed Cache

When the user of a mobile device 31 arrives at a new feature, it is likely that the mobile devices of other users already present at or near the feature will already have relevant feature items in their caches as a result of having accessed these items earlier. This likelihood can be exploited by arranging for a mobile device 31 that wants to load a particular feature item (referred to below as the 'requesting' device), to try first to obtain it from other mobile devices physically nearby and only if this is not possible, resort to accessing it from the item server 53 (or from whatever its original, non-device, source may be). This has benefits for the item server 53 (or other source) in reducing its load; furthermore, if, as is preferred, a separate communication mechanism is used for device-to-device communication (such as Bluetooth short-range radio links) as compared with device-server communication (the WLAN in the embodiment of FIGS. 1 and 2), then the bandwidth loading on the network used by the server 53 to distribute items is also reduced. The response time for a requesting device to receive a requested item will typically also be reduced.

In effect, the caches 44 of nearby mobile devices serve as a distributed cache of feature items for the requesting device.

This way for a requesting device to obtain a needed item can be applied both in the case where pre-emptive caching is not done by the device (an item only being requested when needed for presentation to the user), and in the case where pre-emptive caching of items (as, for example, described above) is being effected. In this latter case, the degree of preemption (that is, how many items are loaded preemptively) is preferably reduced as compared to where nearby devices do not provide an available distributed cache of feature items.

It will be appreciated that whilst it is not essential for the requesting device to make its own cache reciprocally accessible to other devices in order for it to benefit from the distributed cache of feature items offered by other devices, this will normally be the case. It will also be appreciated that even where a device only requests an item when needed for presentation to a user, it will still normally be provided with a cache to enable it to temporarily retain the accessed item in case the user wishes to refer back to it later on.

The requesting device seeks to retrieve a needed feature item first from devices that are nearby because the feature items have location relevancy and so it is the nearby devices that are most likely to have the item of interest in cache. How the request for an item is limited to nearby devices can be done in a number of ways. For example, this can be done implicitly by the requesting device using a short-range communication technology to send out it's request so that only nearby devices receive the request. Alternatively, where the locations of the mobile devices are known as is the case for the mobile devices of the embodiment of FIGS. 1 and 2, then a determination can be made (for example, by the service system 35) as to which other mobile devices are close to the requesting device; these devices can then be contacted to ascertain if any of them have the needed item. Another way of delimiting the nearby devices is by specifying in advance a group of devices that are likely to be near each other (such as a tour party)—in this case, the devices specified are those likely to be nearby rather than those that are actually nearby.

Rather than determining the target group of devices to be contacted for the item of interest on the basis of closeness to the requesting device, this target group can be determined on the basis of which devices are close to the location associated with the item of interest.

In fact, rather that limiting the enquiry for the item of interest to the group of devices that are near (or likely to be near) the requesting device or the location associated with the item of interest, it is alternatively possible to arrange for the item server 53 or other functionality to track for each item which device or devices currently hold that item in cache, or have received and are likely still to have the item in cache. In this case, the requesting device can be arranged to contact mobile devices likely to have the item of interest regardless of whether these mobile devices are nearby (though this constriction may, of course, be implicitly applied where device-to-device communication is by short-range communication means).

Whether the requesting device seeks to retrieve a needed item from a device that is likely to be nearby or from a device that is likely to have the item for some other reason, additional filter(s) can be applied as to the devices used to supply the item. Thus, for example, the requesting device may be arranged to contact all nearby devices using a short-range communications means but only accept to receive the item from a device that is also part of the same tour party (as indicated by an indicator stored as part of the visit data in memory 43).

Two example implementations of a requesting device arranged to seek to retrieve a needed item first from nearby devices will now be described with reference to the simplified process flow charts FIGS. 16 and 17 respectively. In both implementations, it will be assumed that the mobile devices have short-range communications means, such as a Bluetooth radio system, by which they can communicate with each other, these short range communication means being additional to the communication means used to communicate with the server system 35.

Figure 10:
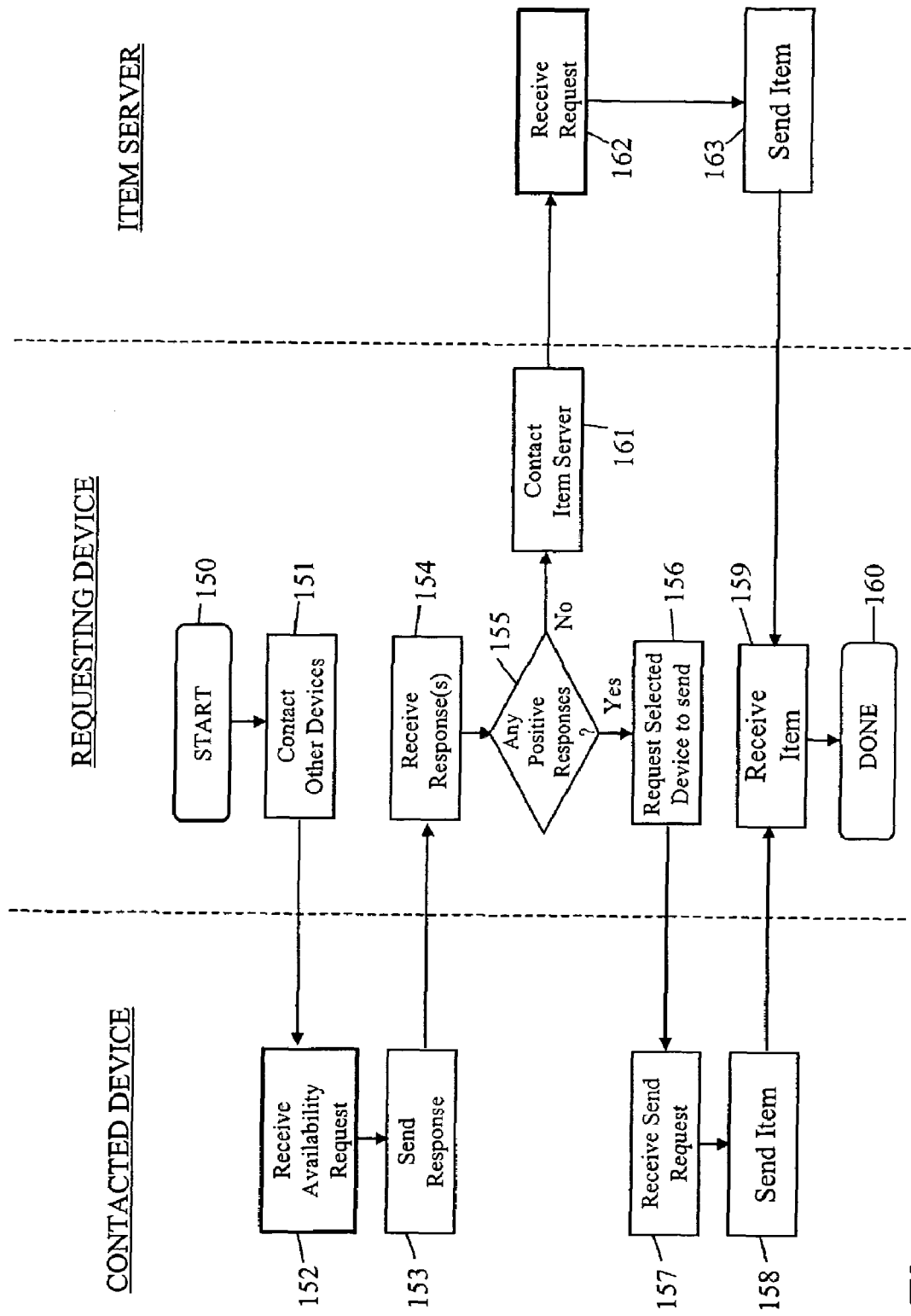
FIG. 10 is a flow chart illustrating the operation of a first implementation of an arrangement by which the FIG. 2 mobile device seeks to obtain a desired feature item first from another mobile device before requesting the item from the service system.

In the first implementation (FIG. 10), the requesting mobile device 31 on determining that it needs a particular feature item, starts off (block 150) by using the short-range communication means to contact all nearby devices (that is, devices within communication range) to ask whether any of these devices have the item of interest in cache (block 151). Upon a contacted mobile device receiving this item availability request (block 152), it checks its cache contents and sends a response (block 153) indicative of whether or not it has the item of interest. The requesting device collates the responses (if any) it receives (block 154) and determines if there are any positive responses (block 155). Assuming at least one positive response is received, the requesting device now requests (block 156) the positively-responding device, or a selected one of the devices if more than one device has responded positively, to send the item of interest. The positively-responding device concerned, on receiving the item request (block 157), returns the item to the requesting device (block 158). The requesting device receives and stores the item (block 159). At this point the process of fetching the item is complete (block 160).

If the requesting device determines at block 155 that it has failed to receive any positive response to its item availability request within a predetermined timeout period, it contacts the item server 53 (block 161) for the item of interest. On receiving this request (block 162), the server 53 returns the item (block 163) to the requesting device which receives and stores it (block 159).

As a variant of this first implementation, the requesting device can be arranged to send its availability request to specific devices rather than as a broadcast message to all devices within range. To this end, the requesting device keeps a list of devices it can contact. This list can be a fixed list set, for example, at the start of the visit and comprising mobile devices of the same tour party. Alternatively, the list can comprise mobile devices known to be close to the requesting device as a result of a comparison of their location with that of the requesting device; such a list has, for example, been compiled by the service system based on the device locations it has received in the location reports from the mobile devices, an updated version of this list being periodically sent to the requesting mobile device (for example, as part of a response message 62). However the list of devices to contact is compiled, the requesting device may contact each device on the list in turn until a positive response is received or may send a multicast message to all devices on the list where the communications means concerned supports multicasting.

Figure 11:
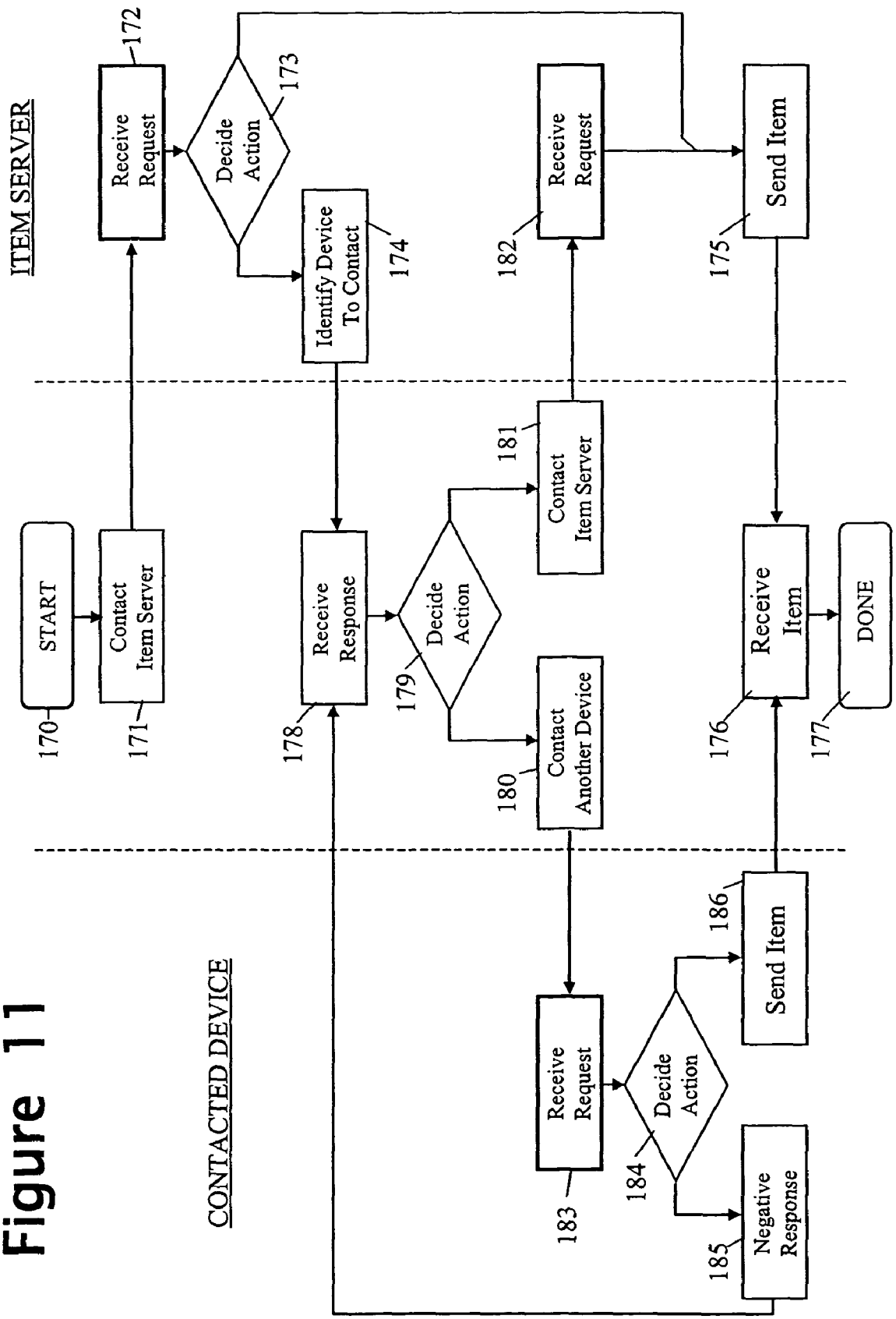
FIG. 11 is a flow chart illustrating the operation of a second implementation of an arrangement by which the FIG. 2 mobile device seeks to obtain a desired feature item first from another mobile device before requesting the item from the service system.

In the second implementation (FIG. 11), the requesting mobile device 31 on determining that it needs a particular item, starts (block 170) by contacting the item server (block 171), or some other service-system functionality, to find out which other mobile device it should contact to obtain a copy of the item. The item server on receiving this request (block 172), determines which device if any has, or is likely to have the item of interest (block 173) and returns the identity of this device (or devices) to the requesting device (block 174). If the item server determines at block 173 that no device has, or is likely to have, the item, then the server itself sends the item to the requesting device (block 175) which receives and stores the item (block 176) thereby completing the item retrieval process (block 177).

The item server can make its determination in block 173 about which devices have, or are likely to have, the item of interest in any of a number of different ways. Thus, as already indicated, the server can use a list of devices known to be related to the requesting device as a result of them all being associated with the same visit party. Alternatively, the server can query functionality of the service system that knows which other devices are close to the requesting device (the pheromone trail subsystem can provide this functionality where it stores the virtual markers left by devices in non-aggregated form against device identity). In a further alternative, the item server or associated functionality is arranged to contact all other mobile devices, or just those near the requesting mobile device, with an item availability request, the positively-responding devices then being identified back to the requesting device in block 174. A yet further alternative involves the item server or associated functionality keeping track of which devices have the item of interest in cache or have previously received the item and are likely still to have it in cache.

Where the item server determines that at least one mobile device has, or is likely to have, the item of interest to the requesting device, the identity of the or each of these devices is returned to the requesting device which receives and temporarily stores these device identities (block 178). The requesting device then determines what action to take next (block 179) which in this case is to contact a first one of the identified devices, using the short-range communication means, to ask it for the item of interest (block 180). The contacted device receives the request (block 183) and decides what action to take (block 184) in dependence on whether or not it has the item of interest in cache. If the contact device has the item of interest, it now returns it to the requesting device (block 186) which receives and stores it (block 176) thereby ending the retrieval process. However, if the contacted device does not have the item of interest, it returns a negative response to the requesting device (block 185). Upon the requesting device receiving this negative response (block 178), it determines what further action to take. If there remains a device not yet contacted in the set of devices identified by the server, the requesting device now contacts the next device of this set. However, if all of the identified devices have been contacted and all have responded negatively (or not at all within a timeout period), then at block 179 the requesting device determines that it must ask for the item from the item server and this it now does (block 181). The item server, on receiving such a request (block 182), responds by sending back the item (block 175).

In both the first and second implementations (FIGS. 16 and 17), it is possible to arrange for a contacted mobile device that does not have the item of interest, to participate more actively in the process of finding a device with the item of interest. More particularly, where a contacted device has an indication as to what other device may have that item, it can be arranged either to pass the identity of that device back to the requesting device or to pass on the request from the latter to that other device. A contacted device can have an indication about what other device may have the item of interest in a variety of ways; for example, the contacted device may have itself passed the item of interest on to another device, or the contacted device may have received the item from another device (the contacted device having subsequently flushed the item from its cache). Another possibility, in the case of the FIG. 11 implementation, is that the contacted mobile device received a list of devices that had, or may have had, the item of interest. In all these cases, provided the contacted device has kept a record of the appropriate information, it can assist the requesting device in finding another device holding the item.

As already mentioned, it is possible to arrange for the item server or other functionality to keep track of which mobile devices have, or are likely to have, each feature item. A simple way of doing this is for the server (or other functionality) to keep a record of the devices to which the item server has served each item in an immediately preceding time window (for example, of five minutes). This record is preferably supplemented by information about the device-to-device transfers of items—for example, either the sending or receiving device can be required to inform the item server (or other functionality) about such a transfer, including the time it was done. The record can be further supplemented by having the devices inform the item server (or other functionality) whenever they delete an item from cache and if this is done, the time window requirement can be removed (or set with a much longer duration). In this way a fairly comprehensive record can be kept about which devices are holding which items. Another approach would be to have each mobile device regularly report what feature items are present in its cache; this information can be incrementally updated, between the regular full reports, as items are added and flushed.

Arranging for the item server (or other functionality) to keep track of which mobile devices hold which items, not only permits a requesting device to be pointed quickly at a device with the item of interest, but also enables the item server to pre-emptively push copies of feature items relevant to a particular zone (for example, a room of the hall 10) to devices in that zone. Thus the item server can determine what items relevant to a zone are not held by any of the mobile devices currently in that room and then take action to have these items copied to devices in the zone. This can be done directly by giving the item server the capability to push items to devices or, where pre-emptive caching is implemented by the devices on the basis of item usage probabilities, indirectly by artificially raising the probabilities of the items not yet cached by devices in the zone—for example, the usage probabilities of these items can be set to unity to cause them to be downloaded immediately. Where this latter approach is used then, in order to distribute such items between the devices in the zone, for each device only certain of the items not cached in devices in the zone would have their usage probabilities raised in this way. The direct or indirect pushing of items relevant to a zone to devices in that zone can be applied to a subset of the items relevant to the zone rather than to all relevant items; in particular, infrequently used or especially large items can be omitted.

In fact, it is possible to arrange for the item server to try to put all items relevant to a zone into the caches of devices in the zone without the need to track what devices hold what items. This can be done by arranging for every device in the zone to take a proportion size of the relevant items, this proportion varying according to the number of devices currently in the zone; whenever a mobile device enters the zone it is pushed its proportion of items, the actual items concerned being identified by taking the items in sequence and continuously cycling through all the items relevant to the zone. The proportion of items allocated to each device is preferably judged in terms of the amount of memory space taken up by the items rather than simply on the basis of the number of items.

A similar, but more restricted, effect can be provided by requiring that a mobile device moving from one zone to another pass on copies of the items relevant to the zone it is leaving to devices in the zone so that at least one copy of each such item is held in the cache of a device in the zone.

Where a track is kept of which mobile devices hold which items, rather than this task being carried out by the item server or other functionality at the server system, tracking can be effected for each zone by one of the mobile devices in the zone, the devices in the zone reporting to that device when they receive and flush items. The mobile device allocated this task can then not only serve to identify to requesting devices which nearby device holds a particular item, but can also be arranged to cause items not locally cached to be pushed directly or indirectly to devices in the zone concerned. When the device allocated this task passes to another zone, the responsibility for carrying out the task is passed to another device still in the zone, either by the exiting device itself or by functionality of the service system.

As already indicated, whilst it is preferred that the device-to-device transfer of feature items is effected by a separate communications mechanism to that used for server-to-device item transfers, this is not essential. One situation where advantages are still to be gained by having devices trying first to obtain an item of interest from a nearby device rather from the server even though the device uses the same communication mechanism for communicating with the server and other devices, is where several wireless LANs are being used to cover different parts of a space both for server-device communication and for device-device communication, In this case, even though a requesting device may take up bandwidth on one wireless LAN whilst receiving an item from a nearby device, the server can transfer a different item to another device communicating with it over a different one of the wireless LANs.

Variants

It will be appreciated that many variants are possible to the above described embodiments of the invention. For example, although in all the embodiments described above, all feature items have originated from the same source, namely, item server 53, it is also possible to provide for multiple item sources each holding a respective subset of the items. In this case, the item identifier associated with each item can be arranged to indicate directly the source from which the item can be obtained, or some other mechanism can be employed to direct an item request to the appropriate source. The multiple item sources effectively form a distributed item server.

As already noted, the distribution of functionality between mobile devices and the service system is not limited to the distributions described above since the availability of communication resources makes it possible to place functionality where most suitable from technical and commercial considerations. Furthermore, in the foregoing reference to a mobile device is not to be construed as requiring functionality housed in a single unit and the functionality associated with a mobile device can be provided by a local aggregation of units.

The above described methods and arrangements are not limited to use in exhibition halls or similar public or private buildings; the methods and arrangements disclosed can be applied not only to internal spaces but also to external spaces or combinations of the two.

The invention claimed is:

1. A method of retrieving a data item to a mobile device carried by a first user visiting a real-world space, the data item being available from a service system to mobile devices of users visiting the space, the method comprising:
   (a) keeping a record on an on-going basis of which mobile devices in said space, if any, hold or are likely to be holding the data item;
   (b) seeking to retrieve the data item to the first user's mobile device by requesting transfer only from mobile devices that, according to said record, hold or are likely to be holding the data item; and
   (c) in the event that (b) is unsuccessful, retrieving the data item to the first user's mobile device by transfer from the service system.

2. A method according to claim 1, wherein the data item is associated with a location in said space, (b) being initiated as the user approaches or is at that location and including carrying out an enquiry limited to mobile devices that are, or are likely to be, near the first user or said location, to identify a mobile device, if any, holding the data item.

3. A method according to claim 2, wherein said enquiry is limited to mobile devices near the mobile device of the first user by having that device make the enquiry by using a short-range communications means to ask other mobile devices if they have the data item.

4. A method according to claim 2, wherein said enquiry is limited to mobile devices near the mobile device of the first user or near the location associated with the data item, by monitoring the locations of the mobile devices in said space.

5. A method according to claim 2, wherein said enquiry is limited to mobile devices likely to be near the mobile device of the first user by pre-defining a set of mobile devices which are associated with users belonging to the same visit group.

6. A method according to claim 2, wherein in (b) said enquiry is carried out by the first user's mobile device.

7. A method according to claim 2, wherein in (b) said enquiry is carried out by the service system at the prompting of the first user's mobile device, the service system identifying back to the first user's mobile device at least one device holding the data item where the enquiry identifies any such device.

8. A method according to claim 1, wherein said on-going record keeping comprises tracking at least the first one of:
   transfers of the data item from the service system to a mobile device;
   transfers of the data item between mobile devices; and
   deletions of the data item from a mobile device.

9. A method according to claim 1, wherein said on-going record keeping comprises at least the first one of:
   periodically making an inventory of items currently held by each mobile device; and
   recording incremental changes to the inventory of each mobile devices as items are added/removed.

10. A method according to claim 1, wherein in (b) said enquiry is carried out by the first user's mobile device.

11. A method according to claim 1, wherein in (b) said enquiry is carried out by the service system at the prompting of the first user's mobile device, the service system identifying back to the first user's mobile device at least one device holding the data item where the enquiry identifies any such device.

12. A method according to claim 1, wherein multiple data items each with a respective associated location in said space are available from the service system, the method further comprising an on-going process in which said space is treated as divided into zones and, for each zone, the service system causes the mobile devices in the zone to load data items associated with locations in that zone beyond the normal needs of the devices whereby to increase the likelihood of (b) being successfully effected from a mobile device in the same zone as the first-user's mobile device.

13. A method according to claim 1, wherein a transfer effected in (a) is effected using a communications mechanism that is different to that used for a transfer effected in (b).

14. A method of retrieving a data item to a mobile device carried by a first user visiting a real-world space, the data item being one of a plurality of data items available from a service system to mobile devices of users visiting the space, each one of said plurality of data items having a respective associated location in said space, the method comprising:
   (a) seeking to retrieve the data item to the first user's mobile device by transfer from another mobile device in said space; and
   (b) in the event that (a) is unsuccessful, retrieving the data item to the first user's mobile device by transfer from the service system; the method further comprising
   an on-going process in which said space is treated as divided into zones and, for each zone, upon a mobile device exiting the zone, it transfers the data items it holds that have associated locations in the zone being exited to devices, if any, still in said zone to increase the likelihood of (a) being successfully effected from a mobile device in the same zone as the first-user's mobile device.

15. An arrangement for retrieving a data item to a mobile device carried by a first user visiting a real-world space, the data item being available from a service system to mobile devices of users visiting said space, the arrangement comprising:
   record means for keeping an on-going record of which mobile devices, if any, hold or are likely to be holding the data item;
   first retrieval means for seeking to retrieve the data item to the first user's mobile device by transfer from another mobile device and including enquiry means for carrying out an enquiry limited to mobile devices that, according to said record, hold or are likely to be holding the data item;
   second retrieval means for retrieving the data item to the first user's mobile device by transfer from the service system; and
   control means for organising retrieval of the data item by first causing the first retrieval means to seek to retrieve the data item and then, if this is unsuccessful, causing the second retrieval means to retrieve the data item.

16. An arrangement according to claim 15, wherein the data item is associated with a location in said space, the arrangement including means responsive to the user approaching that location to cause the control means to initiate retrieval of the date item, and the first retrieval means including enquiry means for carrying out an enquiry limited to mobile devices that are, or are likely to be, near the first user or said location, to identify a mobile device, if any, holding the data item.

17. An arrangement according to claim 16, wherein the first retrieval means includes short-range communication means forming part of said first user's mobile device, the enquiry means being arranged to use said short-range communications means to ask other mobile devices if they have the data item whereby inherently to limit its enquiry to mobile devices near the mobile device of the first user.

18. An arrangement according to claim 16, wherein said arrangement includes location means for obtaining the locations of the mobile devices in said space, the enquiry means being arranged to use the device locations obtained by the location means to limit its enquiry to mobile devices near the mobile device of the first user or near the location associated with the data item.

19. An arrangement according to claim 16, wherein said arrangement includes set-defining means for pre-defining a set of mobile devices which are associated with users belonging to the same visit group, the enquiry means being arranged to limit its enquiry to mobile devices likely to be near the mobile device of the first user by making its enquiry only to devices which, according to said set-defining means, are members of said set.

20. An arrangement according to claim 16, wherein said enquiry means is part of the first user's mobile device.

21. An arrangement according to claim 16, wherein the enquiry means is part of the service system and the first retrieval means further includes means at the first user's mobile device for prompting the enquiry means to carry out its enquiry and identify back to the first user's mobile device at least one device holding the data item where the enquiry identifies any such device.

22. An arrangement according to claim 15, wherein said record means is arranged to track at least the first one of:
   transfers of the data item from the service system to a mobile device;
   transfers of the data item between mobile devices; and
   deletions of the data item from a mobile device.

23. An arrangement according to claim 15, wherein said record means is arranged to carry out at least the first one of:
   periodically making an inventory of items currently held by each mobile device; and
   recording incremental changes to the inventory of each mobile devices as items are added/removed.

24. An arrangement according to claim 15, wherein said enquiry means is part of the first user's mobile device.

25. An arrangement according to claim 15, wherein the enquiry means is part of the service system and the first retrieval means further includes means at the first user's mobile device for prompting the enquiry means to carry out its enquiry and identify back to the first user's mobile device at least one device holding the data item where the enquiry identifies any such device.

26. An arrangement according to claim 15, wherein multiple data items each with a respective associated location in said space are available from the service system, the arrangement further comprising location means for monitoring the locations of the mobile devices, and a zone-based manager that is arranged to treat said space as divided into zones and, for each zone, to cause the mobile devices in the zone to load data items associated with locations in that zone beyond the normal needs of the devices whereby to increase the likelihood of the first retrieval means being successful in seeking to retrieve said data item from a mobile device in the same zone as the first-user's mobile device.

27. An arrangement according to claim 15, wherein the first and second retrieval means are arranged to use different respective communication mechanisms for effecting retrieval of said data item.

28. An arrangement for retrieving a data item to a mobile device carried by a first user visiting a real-world space, the data item being one of a plurality of data items available from a service system to mobile devices of users visiting the space, each one of said plurality of data items having a respective associated location in said space, the arrangement comprising:
   first retrieval means for seeking to retrieve the data item to the first user's mobile device by transfer from another mobile device;
   second retrieval means for retrieving the data item to the first user's mobile device by transfer from the service system;
   control means for organising retrieval of the data item by first causing the first retrieval means to seek to retrieve the data item and then, if this is unsuccessful, causing the second retrieval means to retrieve the data item; and
   transfer means for executing an on-going process in which said space is treated as divided into zones and, for each zone, upon a mobile device exiting the zone, it transfers the data items it holds that have associated locations in the zone being exited to devices, if any, still in said zone to increase the likelihood of the data item being successfully retrieved from a mobile device in the same zone as the first-user's mobile device.

* * * * *